United States Patent
Chen et al.

(10) Patent No.: US 11,589,091 B2
(45) Date of Patent: Feb. 21, 2023

(54) VIDEO INFORMATION PROCESSING METHOD, COMPUTER EQUIPMENT AND STORAGE MEDIUM

(71) Applicant: Tencent Technology (Shenzhen) Company Limited, Shenzhen (CN)

(72) Inventors: Cong Chen, Shenzhen (CN); Chao Zhong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/798,080

(22) Filed: Feb. 21, 2020

(65) Prior Publication Data

US 2020/0195980 A1    Jun. 18, 2020

Related U.S. Application Data

(63) Continuation of application No. PCT/CN2018/103916, filed on Sep. 4, 2018.

(30) Foreign Application Priority Data

Sep. 8, 2017 (CN) .................. 201710806987.X

(51) Int. Cl.
  *H04N 21/235* (2011.01)
  *H04N 21/2743* (2011.01)
  *H04N 21/278* (2011.01)

(52) U.S. Cl.
  CPC ....... *H04N 21/2353* (2013.01); *H04N 21/278* (2013.01); *H04N 21/2743* (2013.01)

(58) Field of Classification Search
  None
  See application file for complete search history.

(56) References Cited

U.S. PATENT DOCUMENTS 9,143,542 B1    9/2015   Tseytlin
2008/0215620 A1 *  9/2008   Folgner ................. G06Q 10/10
(Continued)

FOREIGN PATENT DOCUMENTS

CN    101287093 A    10/2008
CN    103220490 A    7/2013
(Continued)

OTHER PUBLICATIONS

Tencent Technology, ISRWO, PCT/CN2018/103916, Nov. 21, 2018, 6 pgs.

(Continued)

*Primary Examiner* — Kevin S Mai
(74) *Attorney, Agent, or Firm* — Morgan, Lewis & Bockius LLP

(57) ABSTRACT

A video information processing method is performed by a computer device. The method includes: receiving source video information transmitted by a server, the source video information including a first user identifier (ID) transmitting a source video, a source video ID, and a storage location of the source video corresponding to the source video ID in the server; obtaining special effect information on the source video; generating, according to the storage location, the source video ID, and the special effect information, interaction video information associated with the source video ID, the interaction video information including the source video ID, the storage location, the first user ID, and the special effect information; and uploading the interaction video information to the server for storage, so that the server transmits the interaction video information to a terminal corresponding to the first user ID. Videos transferred based on solutions of embodiments of this application include rich information.

20 Claims, 17 Drawing Sheets

(56) References Cited

U.S. PATENT DOCUMENTS

| | | | |
|---|---|---|---|
| 2015/0221339 A1 | 8/2015 | Snibbe et al. | |
| 2016/0071330 A1 | 3/2016 | Ohba et al. | |
| 2016/0300594 A1* | 10/2016 | Allen | H04N 21/4788 |
| 2018/0332318 A1* | 11/2018 | Nagy | H04N 21/47205 |

FOREIGN PATENT DOCUMENTS

| | | |
|---|---|---|
| CN | 106060655 A | 10/2016 |
| CN | 107071580 A | 8/2017 |
| JP | 2015529031 A | 10/2015 |
| JP | 2017118381 A | 6/2017 |
| KR | 101571687 B1 | 11/2015 |

OTHER PUBLICATIONS

Tencent Technology, IPRP, PCT/CN2018/103916, Mar. 10, 2020, 5 pgs.

* cited by examiner

Effect 1: The text rotates with the character in the video
(a)

Effect 2: The text appears in a bomb form
(b)

Effect 3: The text appears in a bullet screen form
(c)

VIDEO INFORMATION PROCESSING METHOD, COMPUTER EQUIPMENT AND STORAGE MEDIUM

CROSS-REFERENCE TO RELATED APPLICATIONS

This application is a continuation application of PCT/CN2018/103916, entitled "VIDEO INFORMATION PROCESSING METHOD, COMPUTER DEVICE, AND STORAGE MEDIUM" filed on Sep. 4, 2018, which claims priority to Chinese Patent Application No. 201710806987.X, filed with the Chinese Patent Office on Sep. 8, 2017 and entitled "VIDEO INFORMATION PROCESSING METHOD AND APPARATUS, AND COMPUTER DEVICE", all of which are incorporated by reference in their entirety.

FIELD OF THE TECHNOLOGY

This application relates to the field of computer information processing technologies, and in particular, to a video information processing method and a computer device.

BACKGROUND OF THE DISCLOSURE

The emergence and rapid development of social applications facilitate communication between people. Content such as texts, pictures, animations, files, or videos may be transferred in real time by using a social application. For example, a first user sends a text or a video to a second user to transfer content the first user wants to express, and the second user receives the content, such as the text or the video, sent by the first user, to implement information transfer between the first user and the second user.

In a current social application, users may interact by using videos. For example, the first user transfers a source video to the second user, and the second user may return a video to the first user after receiving the source video transferred by the first user, to implement information transfer between the first user and the second user by using the videos. That is, information a user wants to express may be transferred to another user by using a video. However, because people have complex emotions and are increasingly demanding more social application functions, during information transfer, a single video can transfer only a quite limited amount of information because of an insufficient amount of video information. That is, information transfer is limited.

SUMMARY

Embodiments of this application provide a video information processing method, a computer device, and a storage medium.

A video information processing method is provided, applied to a computer device, the method including the following operations:

receiving source video information transmitted by a server, the source video information including: a source video identifier (ID), a source video corresponding to the source video ID, a first user ID transmitting the source video, and a storage location of the source video in the server;

obtaining special effect information on the source video;

generating, according to the storage location, the source video ID, and the special effect information, interaction video information associated with the source video ID, the interaction video information including: the source video ID, the storage location, and the special effect information; and uploading the interaction video information to the server, so that the server transmits the interaction video information to a terminal corresponding to the first user ID.

A video information processing method is further provided, applied to a computer device, the method including the following operations:

receiving unread video information transmitted by a server, the unread video information including: each interaction video information ID in an unread state, and a source video ID associated with the interaction video information ID;

receiving an information reading instruction, the information reading instruction carrying a first source video ID;

transmitting a second reading request to the server according to the information reading instruction, the second reading request carrying the first source video ID;

receiving a second reading response returned by the server, the second reading response including interaction video information that is in the unread video information and that is corresponding to each interaction video information ID associated with the first source video ID;

receiving a special effect play instruction, the special effect play instruction carrying a first interaction video information ID; and playing a source video corresponding to the first source video ID and special effect information in interaction video information corresponding to the first interaction video information ID.

A computer device is provided, including one or more processors, memory coupled to the one or more processors and a plurality of programs stored in the memory that, when executed by the one or more processors, cause the computer device to perform the aforementioned methods.

A non-transitory computer storage medium is provided, storing a plurality of machine readable instructions in connection with a computer device having one or more processors, wherein the plurality of machine readable instructions, when executed by the one or more processors, cause the computer device to perform the aforementioned methods.

Through the video information processing method, the computer device, and the storage medium, after the information transmitted by the server about the source video sent by the first terminal corresponding to the first user ID is received, because the source video information includes the first user ID sending the source video, the special effect information may be added based on the source video to enrich information of the source video, that is, the special effect information on the source video is obtained. Then, the interaction video information associated with the source video ID is generated according to the storage location, the source video ID, and the special effect information. The generated interaction video information not only includes the source video ID and the storage location from which the source video can be obtained, but also includes the special effect information representing ideas that the user wants to express, that is, includes relatively rich video information. The interaction video information is uploaded to the server for storage. Subsequently, the terminal corresponding to the first user ID may obtain the interaction video information from the server based on the source video, which enriches video information transferred to the terminal corresponding to the first user ID.

Through the video information processing method, the computer device, and the storage medium, after each interaction video information ID in an unread state and the source video ID associated with the interaction video information ID that are sent by the server are received, the second reading request carrying the first source video ID may be sent to the server, to request to read the interaction video information of each interaction video information ID associated with the first source video ID. After the interaction video information transmitted by the server and corresponding to each interaction video information ID is received, the special effect play instruction carrying the first interaction video information ID is received, so that the source video corresponding to the first source video ID and the special effect information in the interaction video information corresponding to the first interaction video information ID are played. Meanwhile, the source video corresponding to the first source video ID and the special effect information in the interaction video information corresponding to the first interaction video information ID may be played simultaneously. That is, the interaction video information corresponding to the first interaction video information ID further includes special effect information a user wants to add, which enriches video information transferred between users.

BRIEF DESCRIPTION OF THE DRAWINGS

To describe the technical solutions of the embodiments of this application more clearly, the accompanying drawings for illustrating the embodiments are described briefly in the following. Apparently, the drawings in the following description are only some embodiments of this application, and a person of ordinary skill may derive other drawings based on these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. The specific embodiments described herein are merely intended to explain this application but are not intended to limit the protection scope of this application.

Figure 1:
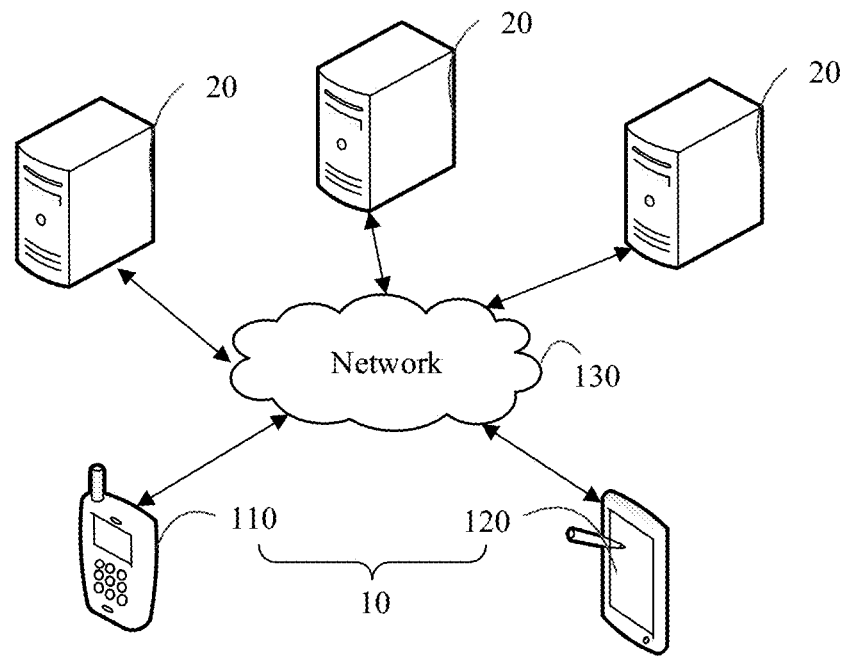
FIG. 1 is a schematic diagram of an application environment of a video information processing method according to an embodiment of this application.

FIG. 1 is a schematic diagram of an application environment of a video information processing method according to an embodiment of this application. As shown in FIG. 1, the application environment includes a terminal 10 and a server 20. The terminal 10 may upload a source video to the server 20, and may also obtain, from the server 20, corresponding interaction video information that is generated by another terminal by performing special effect processing based on the source video. The terminal 10 may further obtain, from the server 20, a source video sent by another terminal, perform special effect processing based on the source video to obtain special effect information on the source video, generate, according to a storage location, a source video ID, and the special effect information, interaction video information associated with the source video ID, and upload the interaction video information to the server 20, so that the another terminal may obtain the interaction video information generated by the terminal from the server 20.

For example, the terminal 10 may include a first terminal 110 and a second terminal 120. The first terminal 110 and the second terminal 120 communicate through a network 130 and the server 20. The first terminal 110 may upload a source video to the server 20. The second terminal 120 may access the corresponding server 20 through the network 130, to request the source video sent by the first terminal 110. After receiving, from the server 20, the source video sent by the first terminal 110, the second terminal 120 may perform special effect processing on the source video to obtain special effect information on the source video, generate, according to a storage location, a source video ID, and the special effect information, interaction video information associated with the source video ID, and upload the interaction video information to the server 20. The interaction video information is sent to the first terminal 110 by using the server 20, to implement transfer of the interaction video information between the first terminal 110 and the second terminal 120. After obtaining the interaction video information, the first terminal 110 may obtain, from the storage location in the server 20, the source video corresponding to the source video ID, and play the source video and the special effect information.

Similarly, the second terminal 120 may also upload a source video to the server 20. The first terminal 110 may access the corresponding server 20 through the network 130, to request the source video sent by the second terminal 120. After receiving, from the server 20, the source video sent by the second terminal 120, the first terminal 110 may perform special effect processing on the source video to obtain special effect information on the source video, generate, according to a storage location, a source video ID, and the special effect information, interaction video information associated with the source video ID, and upload the interaction video information to the server 20. The interaction video information is sent to the second terminal 120 by using the server 20, to implement transfer of the interaction video information between the first terminal 110 and the second terminal 120. After obtaining the interaction video information, the second terminal 120 may obtain, from the storage location in the server 20, the source video corresponding to the source video ID, and play the source video and the special effect information. That is, a terminal may upload a source video and receive interaction video information corresponding to the source video, and may also receive a source video and generate interaction video information based on the source video.

The first terminal 110 and the second terminal 120 may both be any device that can implement intelligent input and output, for example, a desktop computer or a mobile terminal. The mobile terminal may be a smartphone, a tablet computer, an in-vehicle computer, a wearable smart device, or the like. The server 20 may be a server in which a platform for forwarding source video information or interaction video information is located. There may be one or more servers 20.

Figure 2:
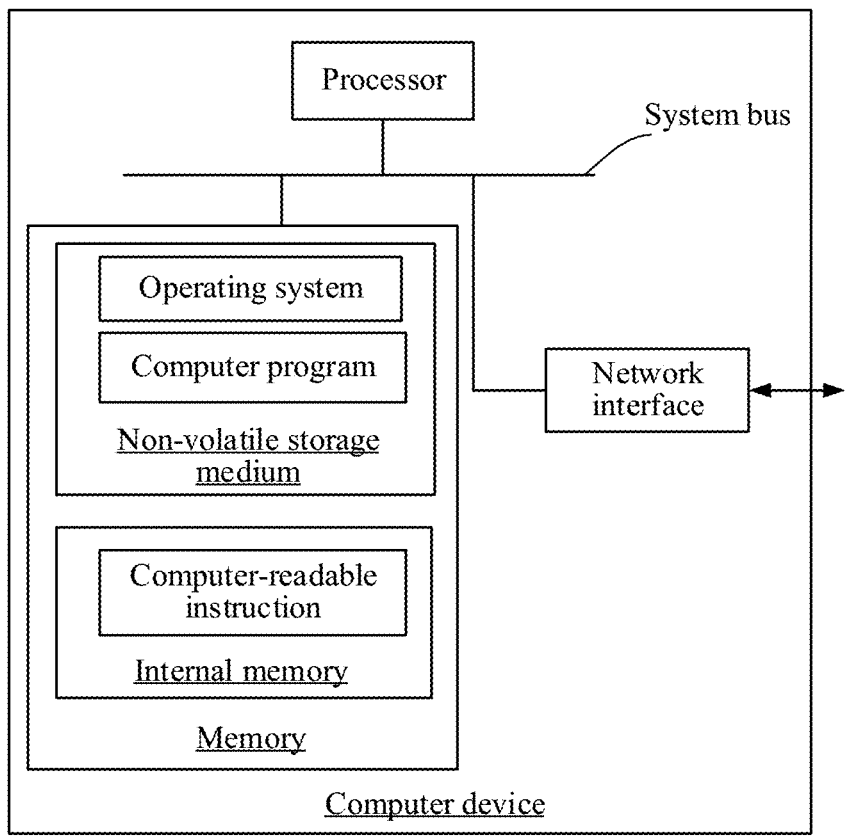
FIG. 2 is a schematic diagram of an internal structure of a computer device according to an embodiment.

FIG. 2 is a schematic diagram of an internal structure of a computer device according to an embodiment. The computer device may be the first terminal 110 or the second terminal 120 in FIG. 1. The computer device includes a processor, a memory, and a network interface that are connected by using a system bus. The memory includes a non-volatile storage medium and an internal memory. The processor of the computer device is configured to provide computing and control capabilities, to support running of the entire computer device. The non-volatile storage medium of the computer device stores an operating system and a computer program. The computer program, when executed by the processor, causes the processor to perform a video information processing method. The internal memory of the computer device provides an environment for running a video information processing apparatus in the non-volatile storage medium. The internal memory may store a computer-readable instruction. The computer-readable instruction, when executed by the processor, causes the processor to perform a video information processing method. The network interface of the computer device is configured to connect to and communicate with the network 130.

It is to be appreciated by a person skilled in the art that, the structure shown in FIG. 2 is merely a structure part related to the solutions of this application, and does not constitute a limitation to the server to which the solutions of this application are applied. A specific server may include more or fewer components than those shown in the figure, or some components may be combined, or a different component deployment may be included.

Figure 3:
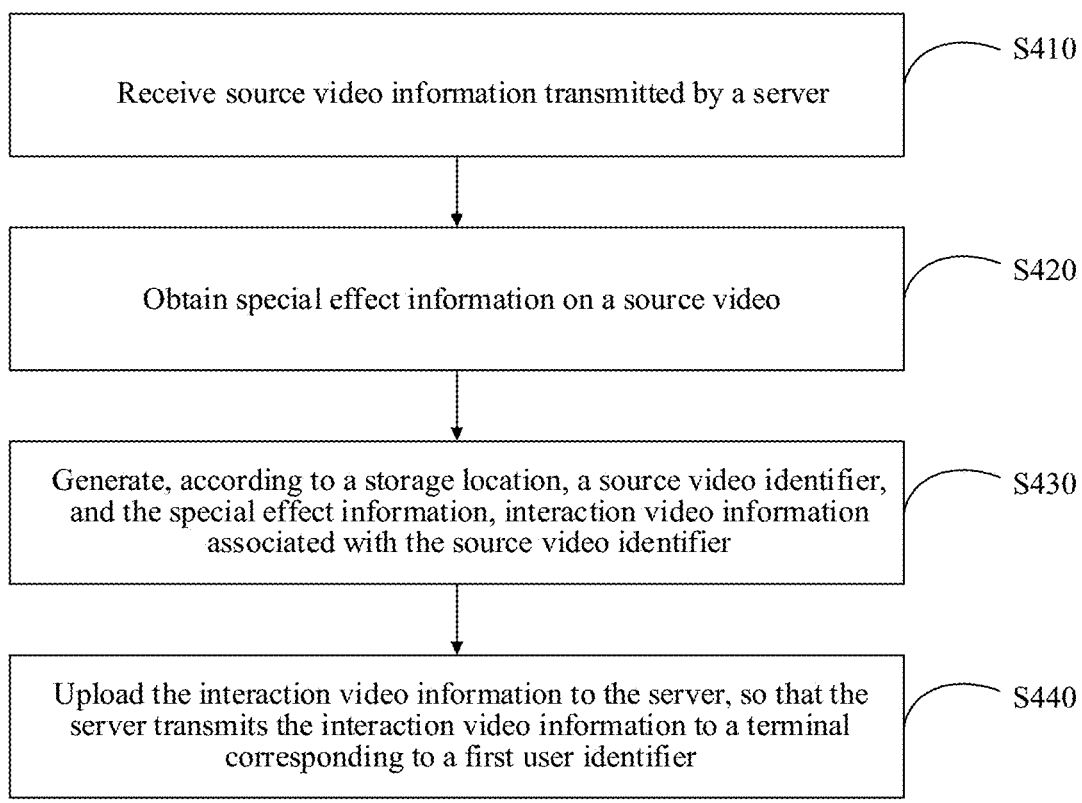
FIG. 3 is a schematic flowchart of a video information processing method according to an embodiment.

As shown in FIG. 3, an embodiment provides a video information processing method applied to a second terminal. The method may be applied to the terminal 10 in FIG. 1. In an example, the method may be applied to the second terminal 120 in FIG. 1. The following description is provided by using an example that the video information processing method is applied to the second terminal 120. The method may include steps S410 to S440.

S410: Receive source video information transmitted by a server.

The source video information includes: a source video ID, a source video corresponding to the source video ID, a first user ID transmitting the source video, and a storage location of the source video in the server.

After a first terminal corresponding to the first user ID sends the source video information to the second terminal corresponding to a second user ID by using the server, the second terminal may return interaction video information based on the source video to the first terminal, to enrich information transferred between the two terminals. That is, the first terminal corresponding to the first user ID may upload the source video to the server. After receiving the source video, the server stores the source video at the storage location, and allocates the source video ID (source video ID) to the source video. Because the source video is uploaded by the first terminal corresponding to the first user ID, the source video corresponds to the first user ID, to indicate that the source video is uploaded by a user corresponding to the first user ID. Then, the server may send, to the second terminal corresponding to the second user ID, the source video information carrying the first user ID sending the source video, the source video ID, the source video corresponding to the source video ID, and the storage location of the source video in the server. The second terminal corresponding to the second user ID may play the received source video, and perform special effect processing on the source video.

S420: Obtain special effect information on the source video.

The special effect information is additional information. In this embodiment, the special effect information may be text information, a graffiti picture, or voice information. The special effect information can be used to enhance information the user wants to transfer.

S430: Generate, according to the storage location, the source video ID, and the special effect information, interaction video information associated with the source video ID.

The source video information obtained by the second terminal corresponding to the second user ID carries the storage location at which the source video sent by the first terminal corresponding to the first user ID is stored in the server and the source video ID. Accordingly, the second terminal corresponding to the second user ID may generate, according to the storage location, the source video ID, and the obtained special effect information, the interaction video information corresponding to the source video ID. That is, the interaction video information corresponds to the source video ID. The interaction video information includes: the source video ID, the storage location, and the special effect information. The corresponding source video ID can be known according to the information included in the interaction video information, so that the corresponding source video can be found.

S440: Upload the interaction video information to the server, so that the server transmits the interaction video information to a terminal corresponding to the first user ID.

After the interaction video information is uploaded to the server, the server may store the interaction video information, and allocate a corresponding interaction video information ID. The server may send the interaction video information to the first terminal corresponding to the first user ID, to implement video information transfer between the first terminal corresponding to the first user ID and the second terminal corresponding to the second user ID.

Through the video information processing method, after the information transmitted by the server about the source video sent by the first terminal corresponding to the first user ID is received, because the source video information includes the first user ID sending the source video, the special effect information may be added based on the source video to enrich information of the source video, that is, the special effect information on the source video is obtained. Then, the interaction video information associated with the source video ID is generated according to the storage location, the source video ID, and the special effect information. The generated interaction video information not only includes the source video ID and the storage location from which the source video can be obtained, but also includes the special effect information representing ideas that the user wants to express, that is, includes relatively rich video information. The interaction video information is uploaded to the server for storage. Subsequently, the terminal corresponding to the first user ID may obtain the interaction video information from the server based on the source video, which enriches video information transferred to the terminal corresponding to the first user ID, and facilitates communication between users.

In an embodiment, the step of obtaining special effect information on the source video includes: obtaining the special effect information on the source video in a playing page presenting and playing the source video.

In this embodiment, the step of obtaining the special effect information on the source video in a playing page presenting and playing the source video includes: receiving a special effect type menu opening instruction on the playing page playing the source video, obtaining each special effect type ID and corresponding special effect type information according to the special effect type menu opening instruction, and displaying the obtained special effect type information; receiving a special effect type selection instruction, where the special effect type selection instruction carries a selected special effect type ID, obtaining each special effect content ID associated with the selected special effect type ID and corresponding special effect content information, and displaying the special effect content information; and receiving a special effect content selection instruction, where the special effect content selection instruction carries a selected special effect content ID, and obtaining special effect information corresponding to the selected special effect content ID.

A plurality of different special effect types are available for selection when special effect processing is performed on the source video. Each special effect type has a corresponding ID and special effect type information (which may be, for example, a special effect type name corresponding to the special effect type ID). A user may select among the special effect types. First, the received source video is played, and the special effect information on the source video is obtained in a playing page presenting and playing the source video. Specifically, the source video is presented and played on the playing page, an operation is performed on the playing page playing the source video, and a special effect type menu opening instruction is received (for example, a special effect type menu key may be tapped on the playing page playing the source video, and a special effect type menu opening instruction is received). In this way, each special effect type ID and corresponding special effect type information may be received, and the special effect type information (for example, the special effect type information includes text effect information (which may be, for example, information "text effect"), graffiti effect information, and voice effect information, the text effect information, the graffiti effect information, and the voice effect information are displayed on the playing page) is displayed. Because the playing page displays the special effect type information, the user needs to perform special effect type information selection. That is, a special effect type selection instruction is received, to know a selected special effect type ID (after a key corresponding to special effect type information is tapped, a corresponding special effect type selection instruction may be received, for example, a key of the text effect information may be tapped, and then a text effect selection instruction is received, the selected special effect type ID being a text effect ID). Each special effect type ID corresponds to different special effect content. That is, the special effect type ID is associated with different special effect content IDs. A special effect content ID corresponds to special effect content information. Accordingly, each special effect content ID associated with the selected special effect type ID and corresponding special effect content information may be obtained, and the special effect content information is displayed. For example, the selected special effect type ID is the text effect ID. Special effect content IDs associated with the text effect ID may include different text information IDs, which are displayed on the playing page for selection. The user may obtain, after selecting from the text information IDs, special effect information corresponding to the selected special effect content ID.

In an embodiment, after the receiving a special effect content selection instruction, the method further includes: obtaining each special effect play form ID associated with the selected special effect content ID and corresponding special effect play form information, and displaying the special effect play form information; and receiving a special effect play form selection instruction, where the special effect play form selection instruction carries a selected special effect play form ID.

The special effect content ID is associated with different special effect play form IDs. A special effect play form ID corresponds to special effect play form information. The special effect content ID is further associated with corresponding special effect information. After the special effect content selection instruction carrying the selected special effect content ID is received, each special effect play form ID associated with the special effect content ID and the corresponding special effect play form information may be obtained, and the special effect information corresponding to the selected special effect content ID may also be obtained. That is, in this embodiment, the special effect information on the source video includes: the special effect information corresponding to the selected special effect content ID, and special effect play form information corresponding to the selected special effect play form ID. During subsequent special effect play, the special effect information corresponding to the selected special effect content ID is played in a play form corresponding to the foregoing corresponding special effect play form information.

Figure 4:
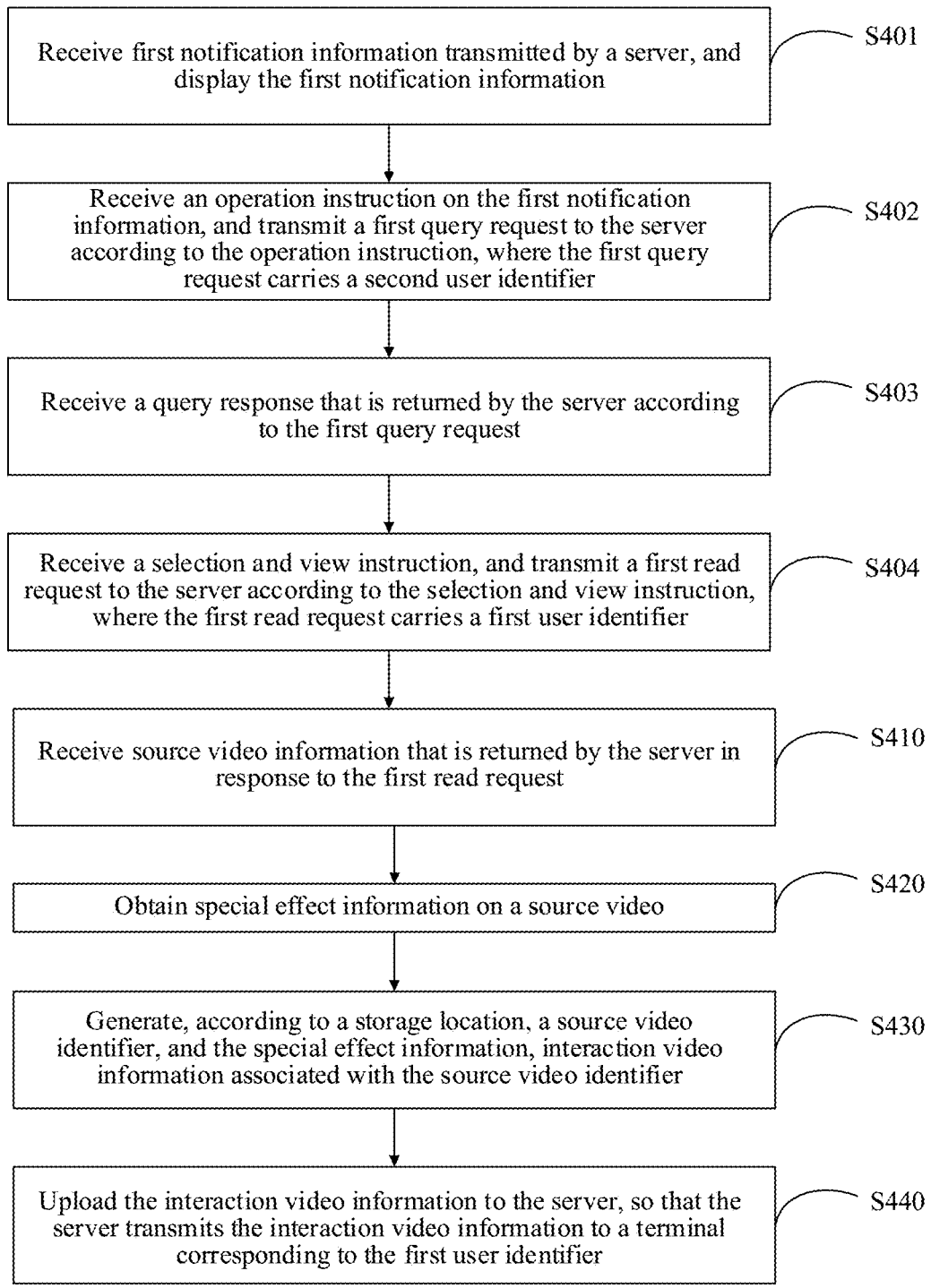
FIG. 4 is a schematic flowchart of a video information processing method according to another embodiment.

As shown in FIG. 4, in an embodiment, before the receiving source video information transmitted by a server, the method further includes steps S401 to S404.

S401: Receive first notification information transmitted by the server, and display the first notification information.

S402: Receive an operation instruction on the first notification information, and transmit a first query request to the server according to the operation instruction, where the first query request carries a second user ID.

S403: Receive a query response that is returned by the server according to the first query request.

The query response includes: a source video ID associated with the second user ID and in an unread state, and a user ID corresponding to the source video ID in the unread state.

S404: Receive a selection and view instruction, and transmit a first reading request to the server according to the selection and view instruction.

The first reading request carries the first user ID. The first notification information is prompt information of a new source video, to prompt the user that the new source video is updated to the server, and the user may download the new source video from the server. The user may perform an operation on the first notification information, and the operation instruction on the first notification information is received. According to the operation instruction on the first notification information, the first query request carrying the second user ID is sent to the server, to request, from the server, a source video ID associated with the second user ID and in an unread state, and a user ID corresponding to the source video ID in an unread state. A plurality of user IDs may upload source videos. Accordingly, user selection needs to be performed. That is, the user may perform a selection operation among the user IDs. Then a selection and view instruction is received. The selection and view instruction carries the first user ID. The first reading request carrying the first user ID is sent to the server. In this embodiment, the source video information is source video information that is returned by the server in response to the first reading request. That is, step S410 of receiving source video information transmitted by a server is receiving source video information that is returned by the server in response to the first reading request.

In an embodiment, after the obtaining special effect information corresponding to the selected special effect content ID, the method further includes:

obtaining a preview instruction on the special effect information, and displaying, according to the preview instruction, the special effect information at a preset location on the playing page of the source video.

Through preview of a display effect of the special effect information, it is convenient for the user to watch and adjust the display location of the special effect information at the same time.

In an embodiment, after the displaying, according to the preview instruction, the special effect information at a preset location on the playing page of the source video, the method further includes:

obtaining a movement instruction on the special effect information, and moving the special effect information according to the movement instruction; and obtaining location information after the movement, and updating the location information after the movement to the special effect information, to obtain updated special effect information.

The special effect information display location is adjusted, to satisfy different requirements.

Figure 5:
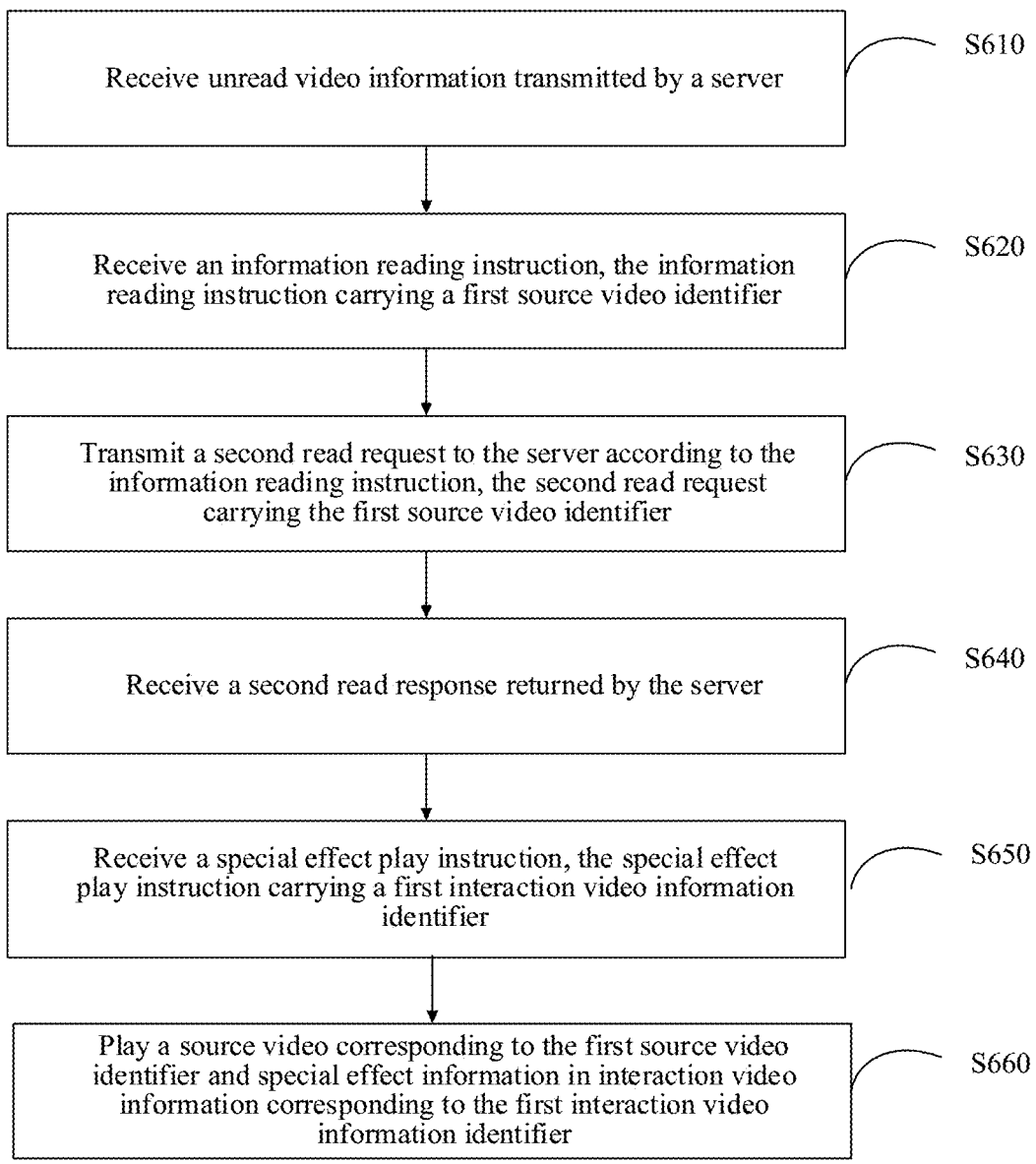
FIG. 5 is a schematic flowchart of a video information processing method according to an embodiment.

As shown in FIG. 5, an embodiment of this application further provides a video information processing method applied to a first terminal. The method may be applied to the terminal 10 in FIG. 1. In an example, the method may be applied to the first terminal 110 in FIG. 1. The following description is provided by using an example that the video information processing method is applied to the first terminal 110. The method may include steps S610 to S660.

S610: Receive unread video information transmitted by a server.

The unread video information includes: each interaction video information ID in an unread state, and a source video ID associated with the interaction video information ID.

After receiving interaction video information sent by a second user ID, the server stores the interaction video information, allocates a corresponding interaction video information ID, and marks a state of the interaction video information ID as unread. A plurality of second user IDs may send interaction video information to the first terminal corresponding to a first user ID. The first user ID receives unread video information transmitted by the server. The unread video information includes each interaction video information ID in an unread state, and a source video ID associated with the interaction video information ID. The interaction video information ID corresponds to a second user ID sending the corresponding interaction video information. That is, the second user ID corresponds to the interaction video information ID.

S620: Receive an information reading instruction, the information reading instruction carrying a first source video ID.

Because a plurality of interaction video information IDs are received, the interaction video information IDs may correspond to different source video IDs. Therefore, a user needs to select to read. That is, the information reading instruction carrying the first source video ID may be received. The first source video ID is a source video ID corresponding to a selected interaction video information ID obtained after the selection among the interaction video information IDs. For example, the received interaction video information IDs are respectively sent by A, B, and C. A source video ID corresponding to the interaction video information ID sent by A is a, a source video ID corresponding to the interaction video information ID sent by B is b, and a source video ID corresponding to the interaction video information ID sent by C is a. After the user selects the interaction video information ID sent by the user A, the source video ID a, that is, the first source video ID, corresponding to the interaction video information ID sent by the user A may be obtained.

S630: Transmit a second reading request to the server according to the information reading instruction, the second reading request carrying the first source video ID.

S640: Receive a second reading response returned by the server.

The second reading response includes interaction video information that is in the unread video information and that is corresponding to each interaction video information ID associated with the first source video ID.

For interaction video information corresponding to interaction video information IDs, different interaction video information IDs may correspond to a same source video ID, that is, different users perform special effect processing on a source video corresponding to a same source video ID. In this case, the second reading request carrying the first source video ID is sent to the server, to request the server to send the interaction video information corresponding to each interaction video information ID associated with the first source video ID, so that the interaction video information corresponding to each interaction video information ID associated with the first source video ID is obtained. For example, for the users A, B, and C, after the interaction video information ID sent by the user A is selected, the source video ID a corresponding to the interaction video information ID sent by the user A may be obtained. The interaction video information ID sent by the user C also corresponds to the source video ID a. The users A and C perform special effect processing on the same source video. In this case, the second reading request carrying the first source video ID, that is, the source video ID a, is sent to the server, and the server responds to the second reading request, so that interaction video information that is in the unread video information and that is corresponding to all interaction video information IDs associated with the source video ID a may be read and sent to the user.

S650: Receive a special effect play instruction, the special effect play instruction carrying a first interaction video information ID.

S660: Play a source video corresponding to the first source video ID and special effect information in interaction video information corresponding to the first interaction video information ID.

After the interaction video information corresponding to each interaction video information ID associated with the first source video ID is received, the source video and special effect information may be played. Because there may be a plurality of types of different interaction video information, selection needs to performed before play, that is, one piece of interaction video information is selected for play. Specifically, the special effect play instruction carrying the first interaction video information ID is received, and then the source video corresponding to the first source video ID and the special effect information in the interaction video information corresponding to the first interaction video information ID may be played. For example, received interaction video information IDs corresponding to the first source video ID include D, E, and F, and interaction video information needs to be selected for play. For example, special effect information in interaction video information corresponding to the interaction video information ID D is selected for play.

Through the video information processing method, after each interaction video information ID in an unread state and the source video ID associated with the interaction video information ID that are sent by the server are received, the second reading request carrying the first source video ID may be sent to the server, to request to read the interaction video information of each interaction video information ID associated with the first source video ID. After the interaction video information transmitted by the server and corresponding to each interaction video information ID is received, the special effect play instruction carrying the first interaction video information ID is received, so that the source video corresponding to the first source video ID and the special effect information in the interaction video information corresponding to the first interaction video information ID are played. Meanwhile, the source video corresponding to the first source video ID and the special effect information in the interaction video information corresponding to the first interaction video information ID may be played simultaneously. That is, the interaction video information corresponding to the first interaction video information ID further includes special effect information a user wants to add, which enriches video information transferred between users, which facilitates communication between users.

In an embodiment, before the receiving unread video information transmitted by a server, the method further includes: receiving second notification information transmitted by the server; receiving an operation instruction on the second notification information; and transmitting a second query request to the server according to the operation instruction, where the second query request carries a first user ID.

In this embodiment, the received unread video information transmitted by the server is received unread video information that is returned by the server in response to the second query request.

The second notification information is prompt information of new interaction video information, to prompt the user that the new interaction video information is updated to the server, and the user may download the new interaction video information from the server. The user may perform an operation on the second notification information. An operation instruction on the second notification information is received, and a second query request carrying the first user ID is sent to the server according to the operation instruction on the second notification information, to request, from the server, unread interaction video information associated with the first user ID. The received unread video information transmitted by the server is received unread video information that is returned by the server in response to the second query request. The returned unread video information is associated with the first user ID.

In an embodiment, after the receiving a second reading response returned by the server, the method further includes steps of: generating a corresponding pendant according to each interaction video information ID associated with the first source video ID and displaying the pendant.

As the second reading response includes the interaction video information that is in the unread video information and that is corresponding to each interaction video information ID associated with the first source video ID, a plurality of users may perform special effect processing on the source video corresponding to the first source video ID, and interaction video information corresponding to a plurality of interaction video information IDs may be obtained. That is, the interaction video information corresponding to each interaction video information ID associated with the first source video ID corresponds to the second user ID. Specifically, a corresponding pendant may be generated according to each interaction video information ID associated with the first source video ID and the second user ID corresponding to the interaction video information ID and displayed.

In this embodiment, the receiving a special effect play instruction is specifically receiving the special effect play instruction by using the pendant. Specifically, after the pendant corresponding to each interaction video information ID is displayed, the user may perform an operation on the pendant, which facilitates the selection operation of the user. For example, a tap operation may be performed on the pendant. A special effect play instruction on the pendant is received. The special effect play instruction on the pendant carries the first interaction video information ID (an interaction video information ID selected according to the special effect play instruction on the pendant). Then, the source video corresponding to the first source video ID and the special effect information in the interaction video information corresponding to the first interaction video information ID are played.

In an embodiment, when the source video corresponding to the first source video ID is played, the source video corresponding to the first source video ID is locally searched for and obtained;

or the second reading response includes the source video corresponding to the first source video ID.

That is, when the source video corresponding to the first source video ID is played, if the source video corresponding to the first source video ID is stored locally, the source video corresponding to the first source video ID may be directly searched for and obtained locally. If the source video corresponding to the first source video ID is not stored locally, the source video corresponding to the first source video ID is included in the obtained second reading response, and the source video corresponding to the first source video ID may be obtained from the second reading response.

The video information processing method is described below by using a specific embodiment. Operations after a second terminal corresponding to a second user ID receives a source video with a source video ID 10 that is from a first terminal corresponding to a first user ID and that is transmitted by a server are used as an example.

Figure 6:
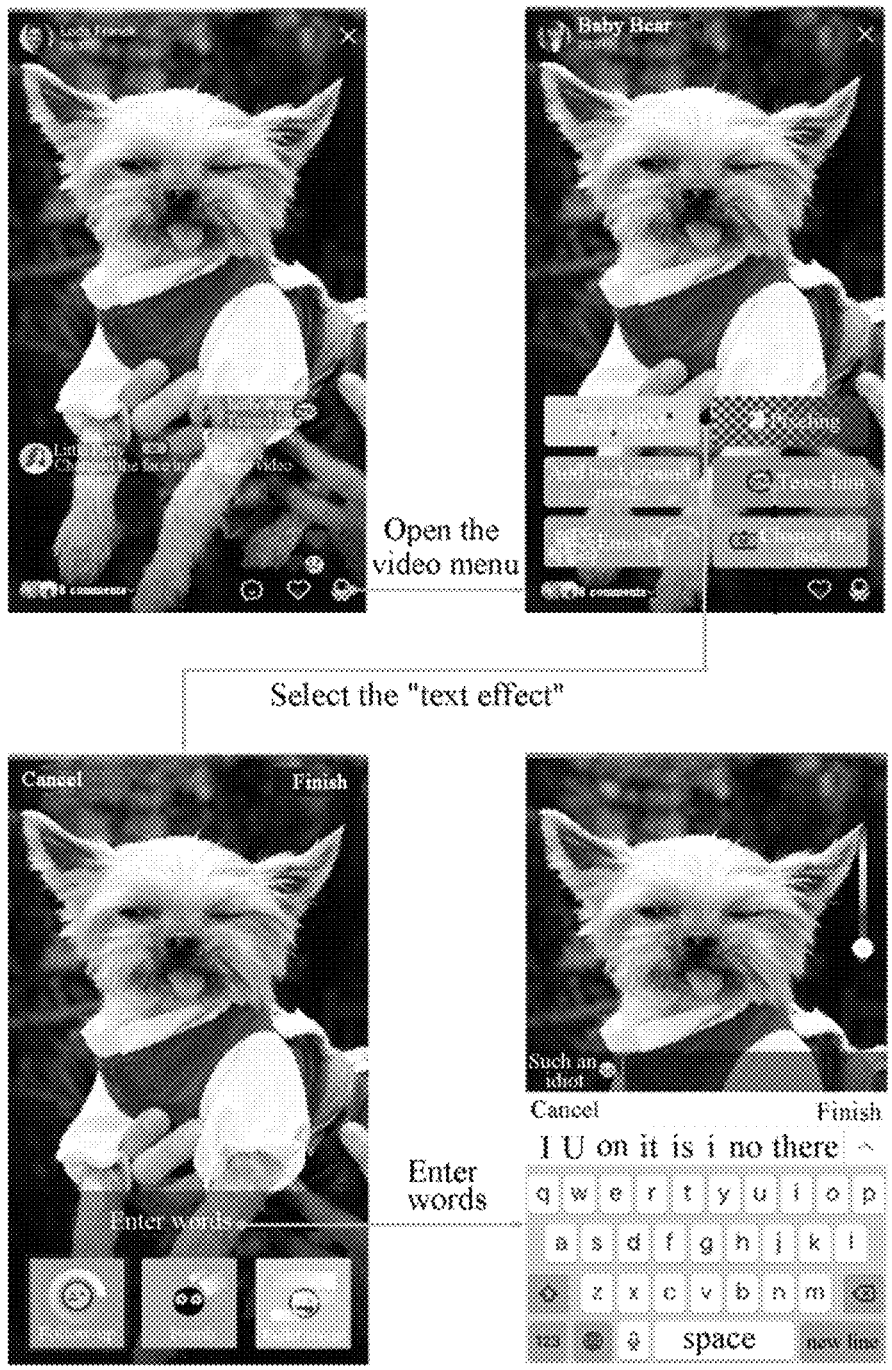
FIG. 6 shows diagrams of pages in a text effect selection process according to an embodiment.
Figure 7:
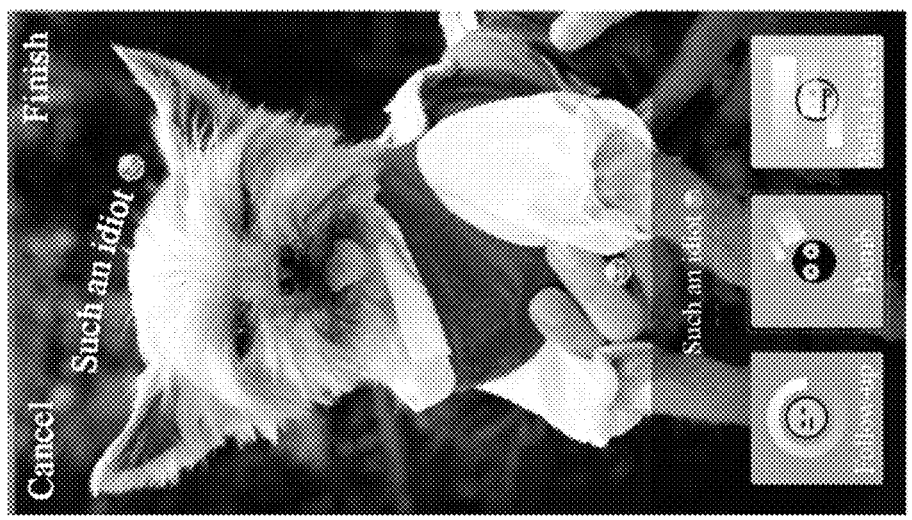
FIG. 7(*a*) to FIG. 7(*c*) are diagrams of playing effect pages of special effect information corresponding to a text effect type according to an embodiment.
Figure 7:
Figure 7:
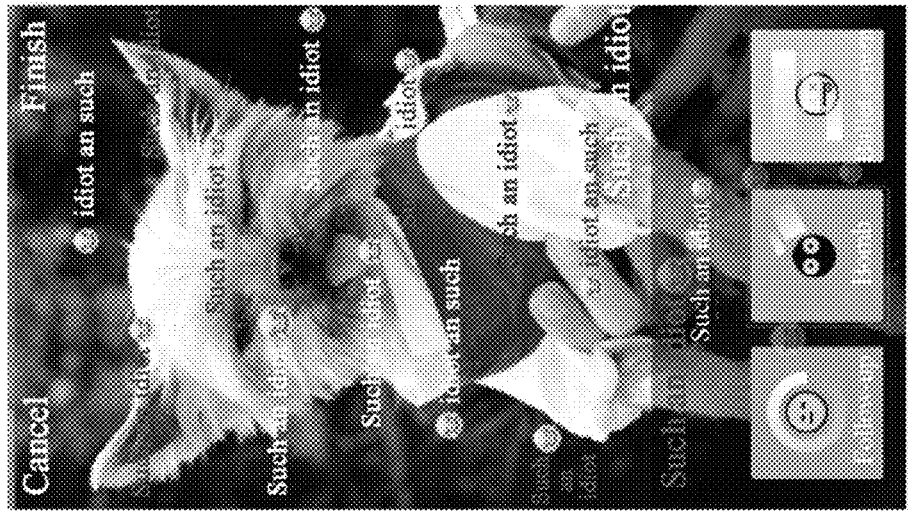

FIG. 6 shows a playing page of the source video with the ID 10. A special effect type menu key is present on the playing page. The special effect type menu key is tapped (that is, opening the video menu in FIG. 6). A special effect type menu opening instruction is received, each special effect type ID and corresponding special effect type information are obtained, and the obtained special effect type information is displayed. For example, the special effect type information includes text effect information, graffiti effect information, and voice effect information. A text effect type is selected. Special effect play form information corresponding to the text effect type is selected. For example, the special effect play form information includes follow-up play form information, bomb play form information, and bullet screen play form information. Further, special effect information corresponding to the text effect type is obtained. For example, the bullet screen play form information is selected, and the special effect information is "such an idiot". After the selections are completed, the special effect information may be displayed on the playing page for preview. FIG. 7(*a*) shows a preview effect of playing special effect information in a follow-up play form (the special effect information rotates). FIG. 7(*b*) shows a preview effect of playing special effect information in a bomb play form. FIG. 7(*c*) shows a preview effect of playing special effect information in a bullet screen play form.

Figure 8:
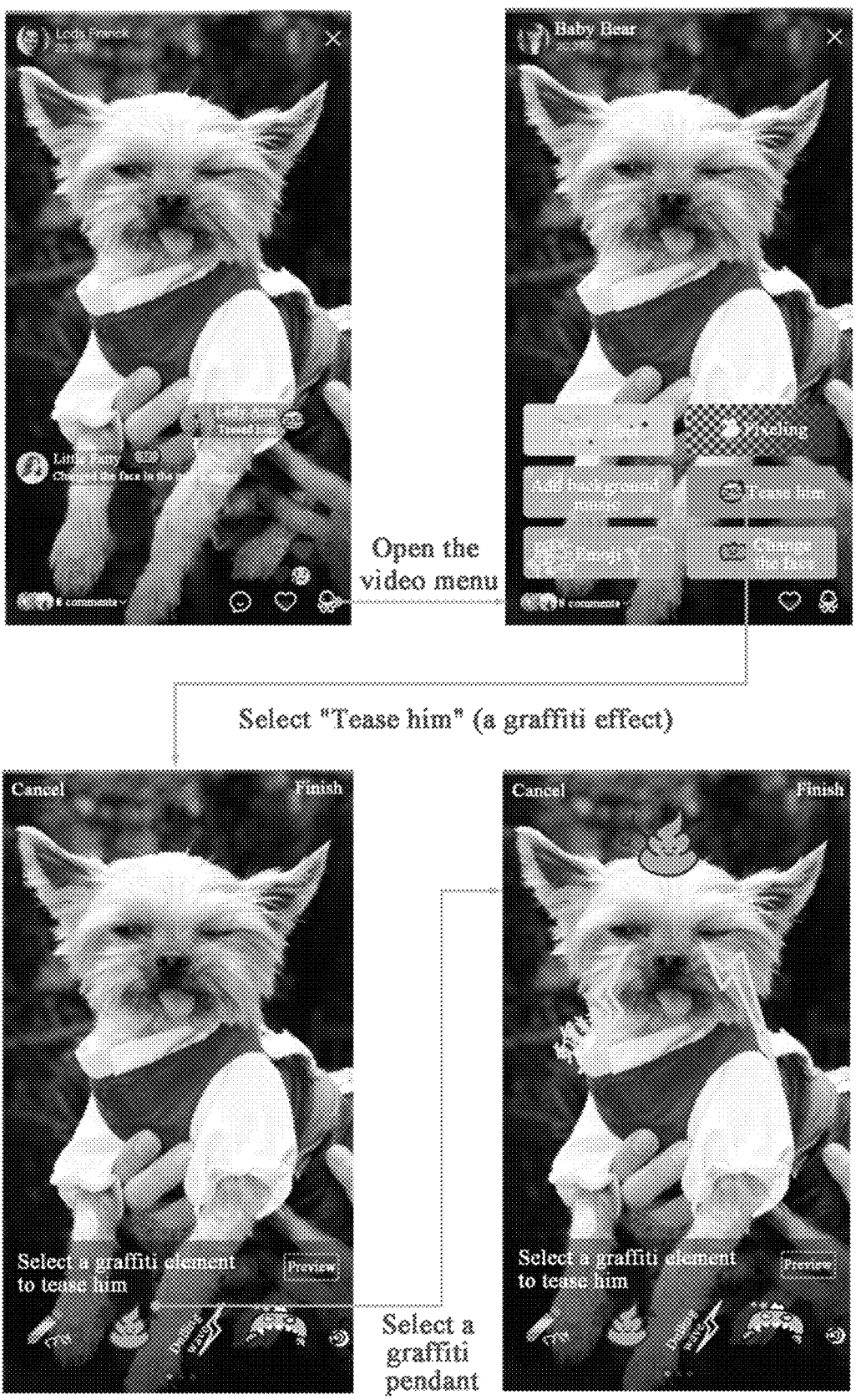
FIG. 8 shows diagrams of pages in a graffiti effect selection process according to an embodiment.
Figure 9:
FIG. 9 shows diagrams of playing effect pages of special effect information corresponding to a graffiti effect type according to an embodiment.

FIG. 8 shows a playing page of the source video with the ID 10 is presented, and a special effect type menu key is present on the playing page. The special effect type menu key is tapped. A special effect type menu opening instruction is received, each special effect type ID and corresponding special effect type information are obtained, and the obtained special effect type information is displayed. A graffiti effect type is selected, and special effect information corresponding to the graffiti effect type is selected. For example, a crying graffiti picture P1 and a graffiti picture P2 are selected, or a graffiti picture drawn by a user may be used. After the selections are completed, the special effect information of the graffiti effect type may be displayed on the playing page for preview. FIG. 9 shows a preview effect of the special effect information corresponding to the graffiti effect type.

Figure 10:
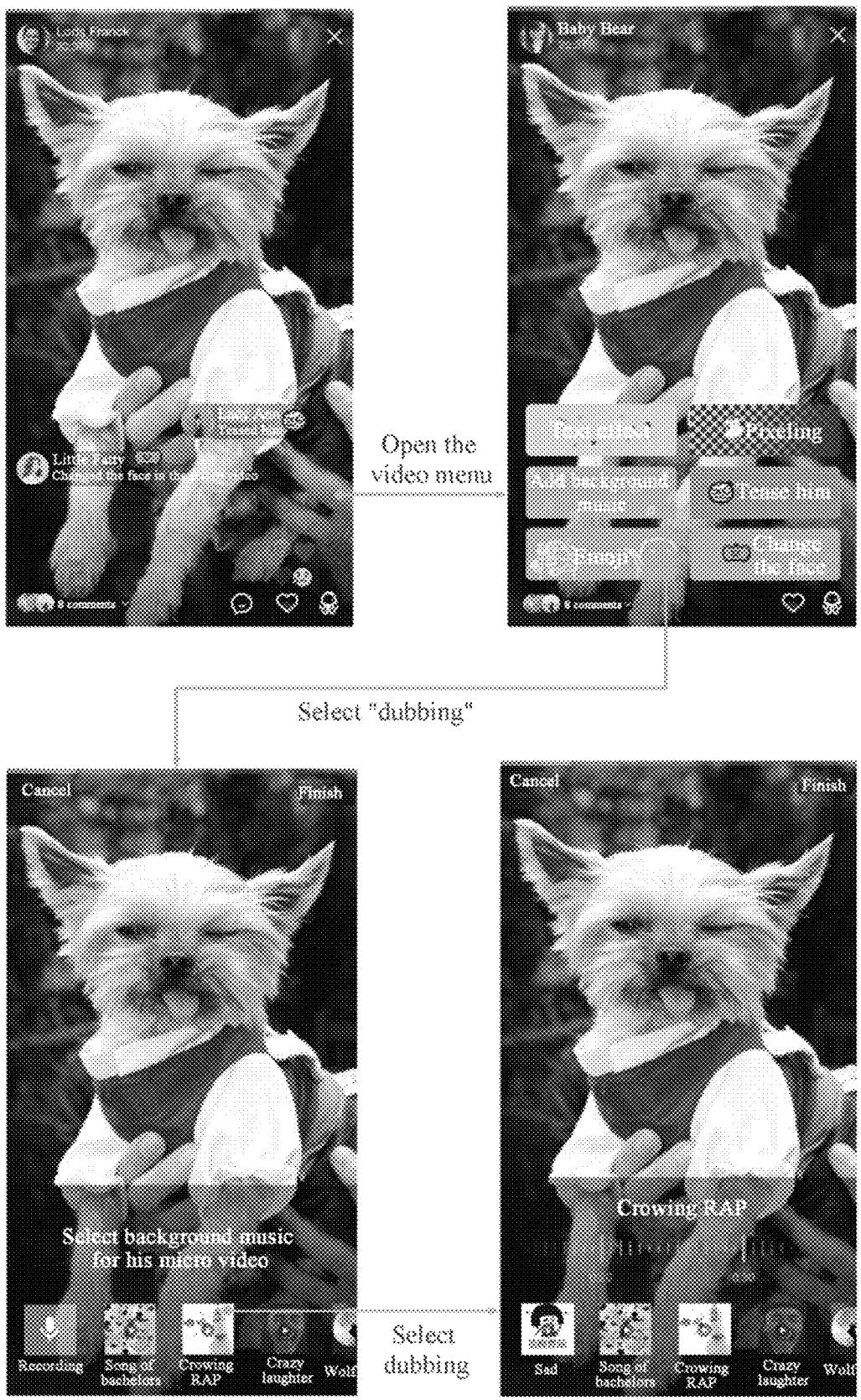
FIG. 10 shows diagrams of pages in a voice effect selection process according to an embodiment.
Figure 11:
FIG. 11 shows diagrams of playing effect pages of special effect information corresponding to a voice effect type according to an embodiment.

FIG. 10 shows a playing page of the source video with the ID 10 is presented, and a special effect type menu key is present on the playing page. The special effect type menu key is tapped. A special effect type menu opening instruction is received, each special effect type ID and corresponding special effect type information are obtained, and the obtained special effect type information is displayed. A voice effect type (corresponding to "dubbing" in FIG. 10) is selected, and special effect information corresponding to the voice effect type is selected. For example, a voice of crowing RAP is selected, or a voice recorded by a user may be used. FIG. 11 shows display screens when the user records the voice. After the selections are completed, the special effect information corresponding to the voice effect type and the source video may be synchronously displayed on the playing page for preview.

Figure 12:
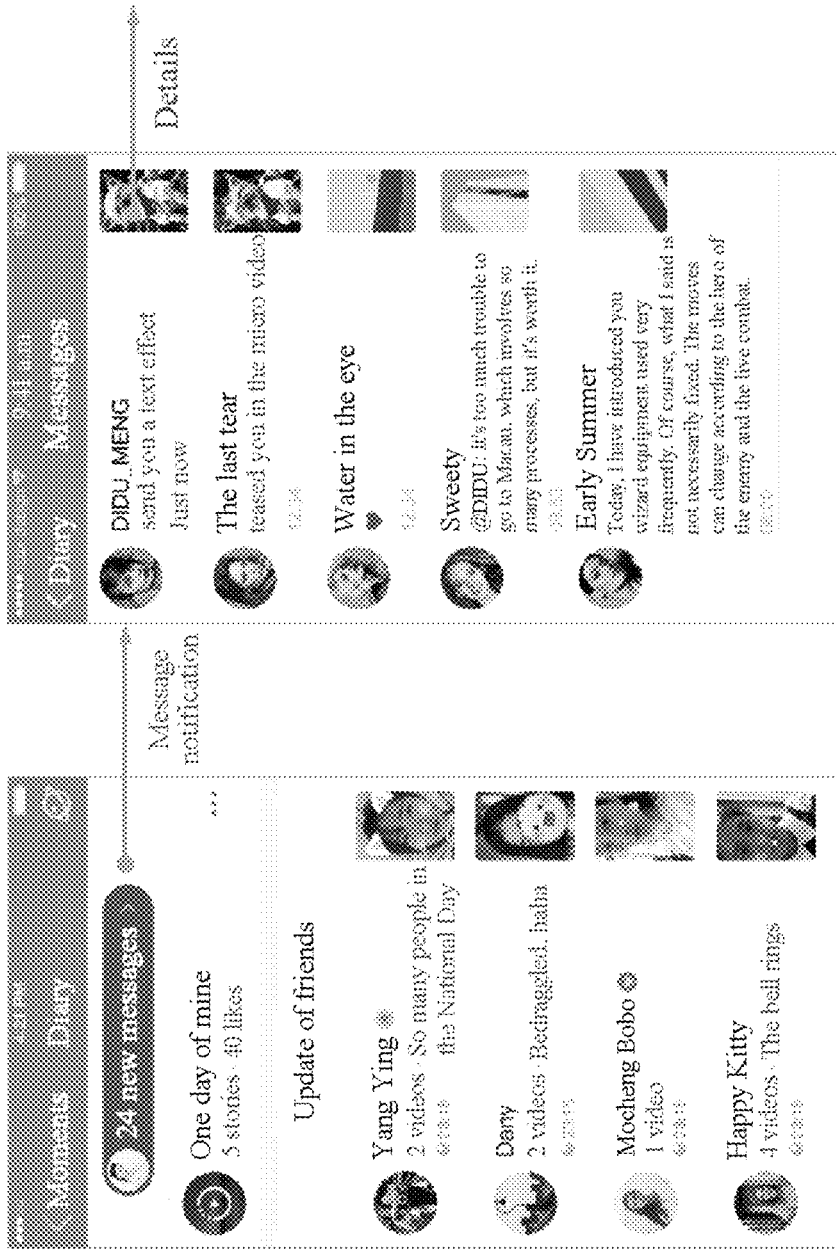
FIG. 12(*a*) to FIG. 12(*c*) are diagrams of a playing principle of interaction video information according to an embodiment.

The second user ID generates interaction video information and then sends the interaction video information to the server. The server sends second notification information to the first user ID. FIG. 12(*a*) is a diagram of a screen when the first user ID receives the second notification information sent by the server. An operation instruction on the second notification information is received. A second query request is sent to the server according to the operation instruction. The second query request carries the first user ID. Unread video information returned by the server in response to the second query request is received. The unread video information includes: each interaction video information ID in an unread state and a source video ID associated with the interaction video information ID. Each interaction video information ID corresponds to a second user ID. Therefore, a user ID sending the interaction video information may be known. For example, DIDU_MENG shown in FIG. 12(*b*) is a corresponding second user ID sending one of interaction video information IDs 11. An information reading instruction carrying the source video ID 10 corresponding to the interaction video information ID 11 of DIDU_MENG is received, a second reading request carrying the source video ID 10 is sent to the server, and a second reading response returned by the server is received. The second reading response includes interaction video information that is in the unread video information and that is corresponding to each interaction video information ID associated with the source video ID 10. A corresponding pendant generated according to the interaction video information ID associated with the source video ID 10 is displayed on the playing page, as shown in FIG. 12(*c*). A special effect play instruction on the pendant is received. The special effect play instruction carries the interaction video information ID 11. The source video corresponding to the source video ID 11 and special effect information in the interaction video information corresponding to the interaction video information ID 11 are played.

Specifically, the foregoing video information exchange process is completed by the first terminal, the server, and the second terminal cooperatively. Critical video information is source video information and interaction video information. The source video information in the server includes a storage location of the source video, the first user ID uploading the source video, a video type (for example, 1 represents a source video type) corresponding to the source video, and the source video ID. The interaction video information in the server includes the interaction video information ID, the source video ID corresponding to the interaction video information ID, the storage location of the source video corresponding to the source video ID, the second user ID uploading the interaction video information, an interaction video information creation time, a video type (for example, 2 represents an interaction video information type) corresponding to the interaction video information, and the special effect information. A difference from the source video information lies in that the interaction video information includes the special effect information, and the corresponding special effect information is presented when the user plays the source video. Each different user may create one or more pieces of interaction video information on each source video.

Figure 13:
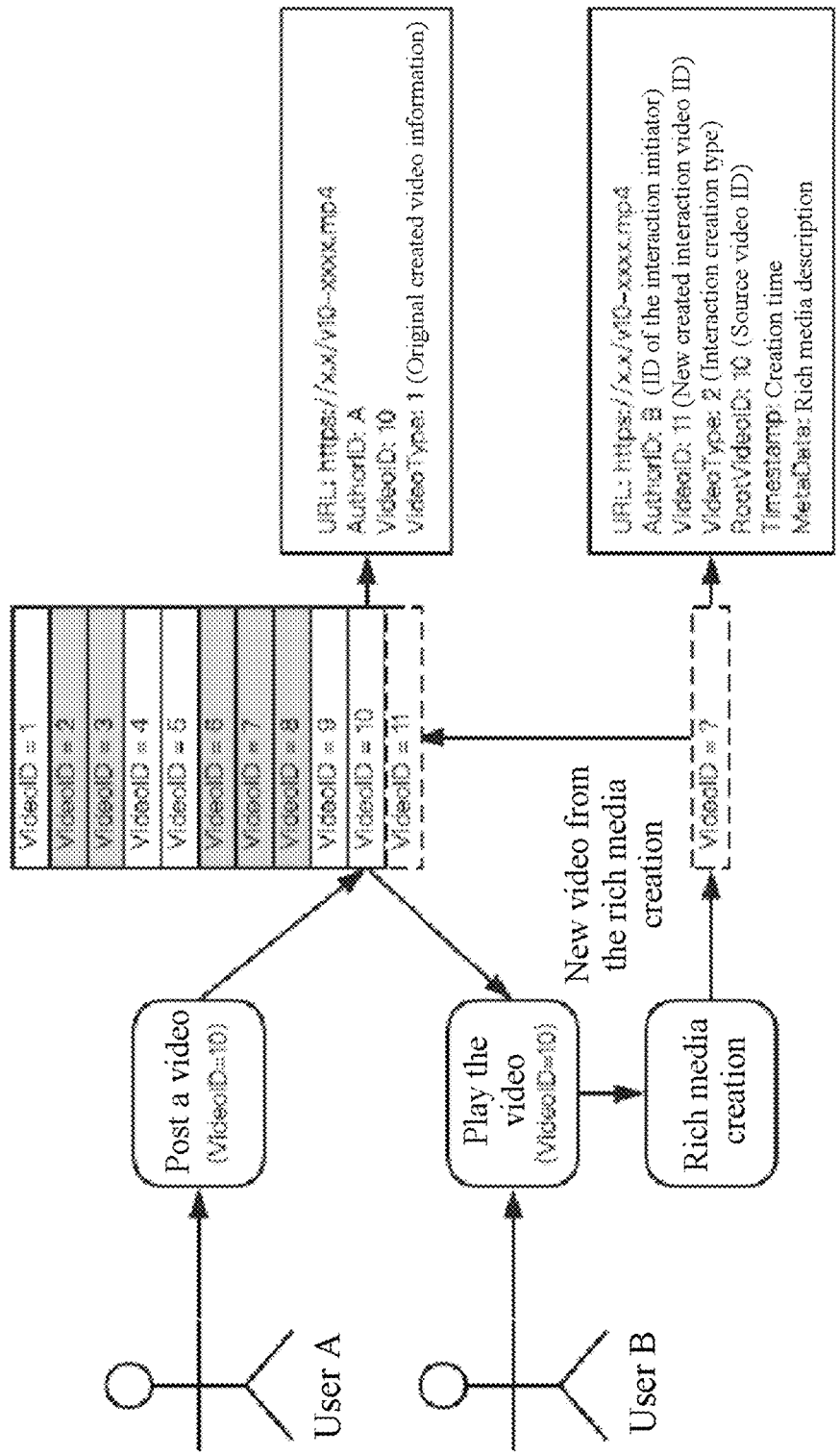
FIG. 13 is a principle diagram of video transfer between a user A and a user B.

A user A of the first terminal performs video interaction with a user B of the second terminal. As shown in FIG. 13, a video with a video ID VideoID=10 is a source video posted by the user A, and a corresponding source video ID VideoID is 10. As a friend of the user A, the user B may obtain the source video posted by the user A. The user B opens the source video VideoID=10 posted by the user A, and performs rich media creation (adds special effect information) based on the source video VideoID=10 to obtain interaction video information. Rich media description in FIG. 13 is the special effect information. After the interaction video information is submitted to the server, an interaction video ID VideoID=11 is allocated to the interaction video information.

Figure 14:
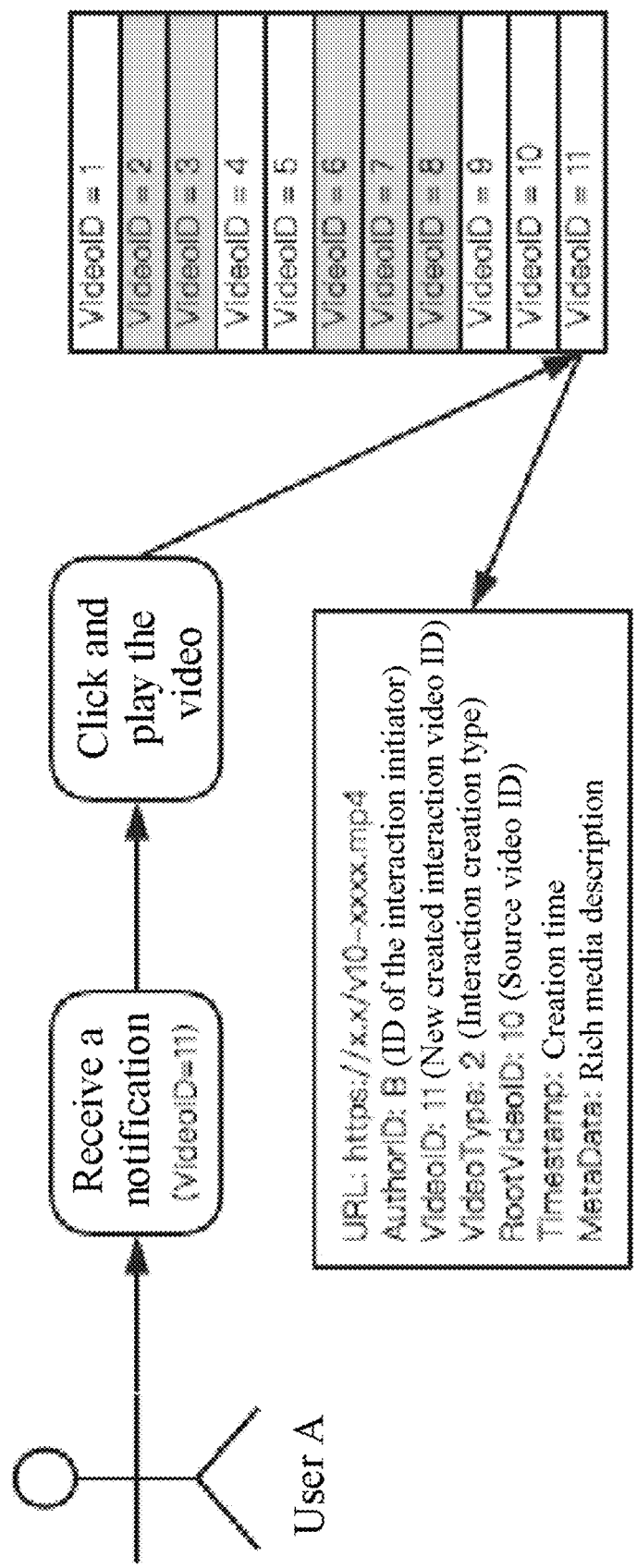
FIG. 14 is a principle diagram of obtaining interaction video information by the user A.

The server obtains the user A corresponding to the associated source video VideoID=10 through query according to the interaction video information VideoID=11. In this case, the user A may obtain corresponding notification information. As shown in FIG. 14, after receiving the notification information, the user A may obtain and play the source video corresponding to the source video VideoID=10, and play the special effect information carried in the interaction video information, that is, play content corresponding to the rich media description.

Figure 15:
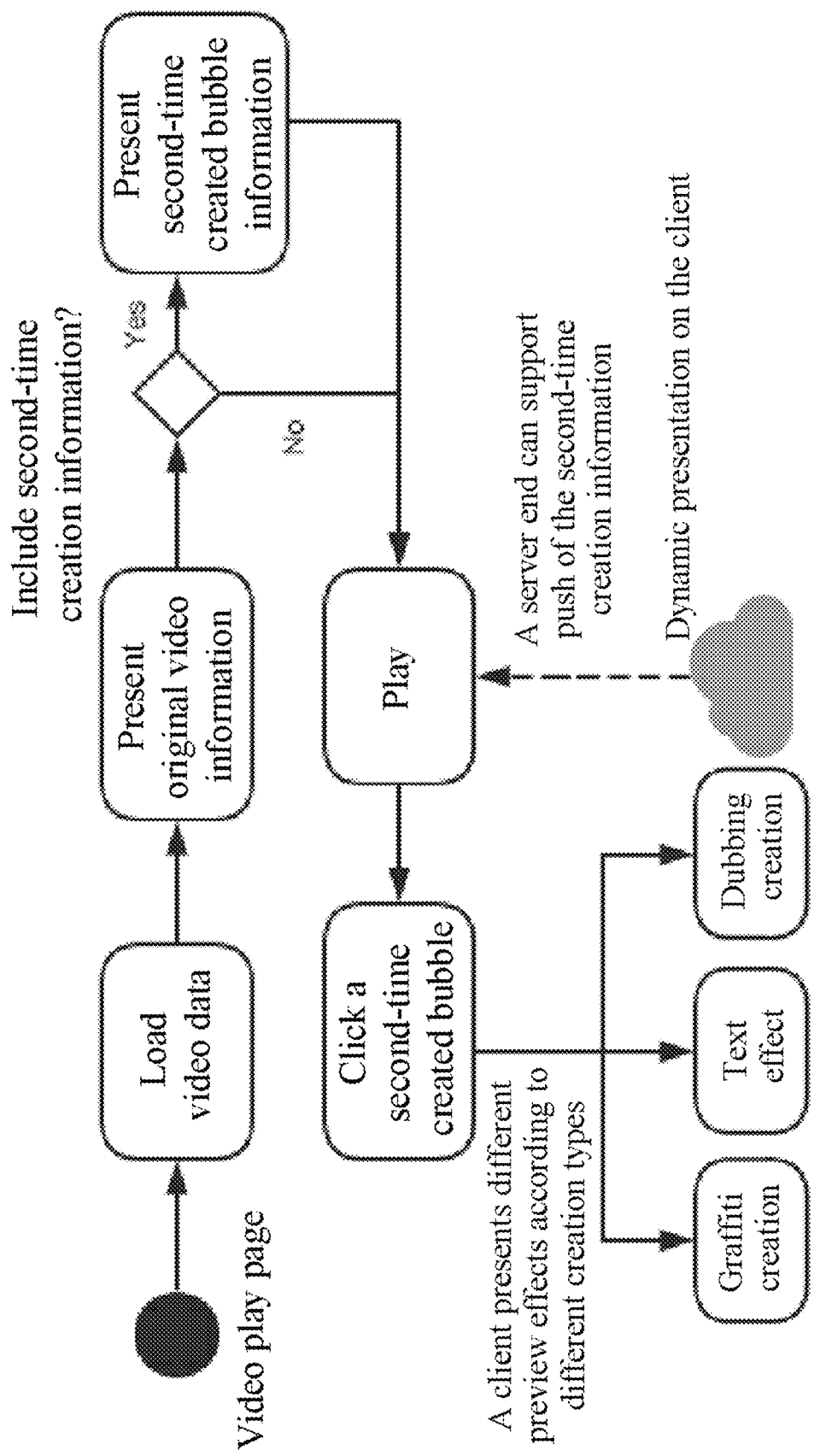
FIG. 15 is a principle diagram of video playing.

In addition, each source video and interaction video information may be normally played. As shown in FIG. 15, a video playing page is opened to load video data, and original video information, that is, source video information, is presented. It may be determined whether the source video information corresponds to interaction video information. If no, the source video is directly played. If yes, a pendant, that is, second-time created bubble information, corresponding to the interaction video information may be displayed. The second-time created bubble information is tapped. Different special effects are presented according to different special effect information in the interaction video information. A server end in FIG. 15 may be understood as the foregoing server. If the interaction video information corresponding to the source video is present (that is, the second-time created bubble information is included) in the server, the server end may push the second-time created bubble information to the first terminal corresponding to the first user ID, for the first terminal to play.

An embodiment further provides a computer device. An internal structure of the computer device may be shown in FIG. 2. A video information processing apparatus is disposed in the computer device. The apparatus includes modules, and each module may be all or partially implemented by software, hardware, or combination thereof.

Figure 16:
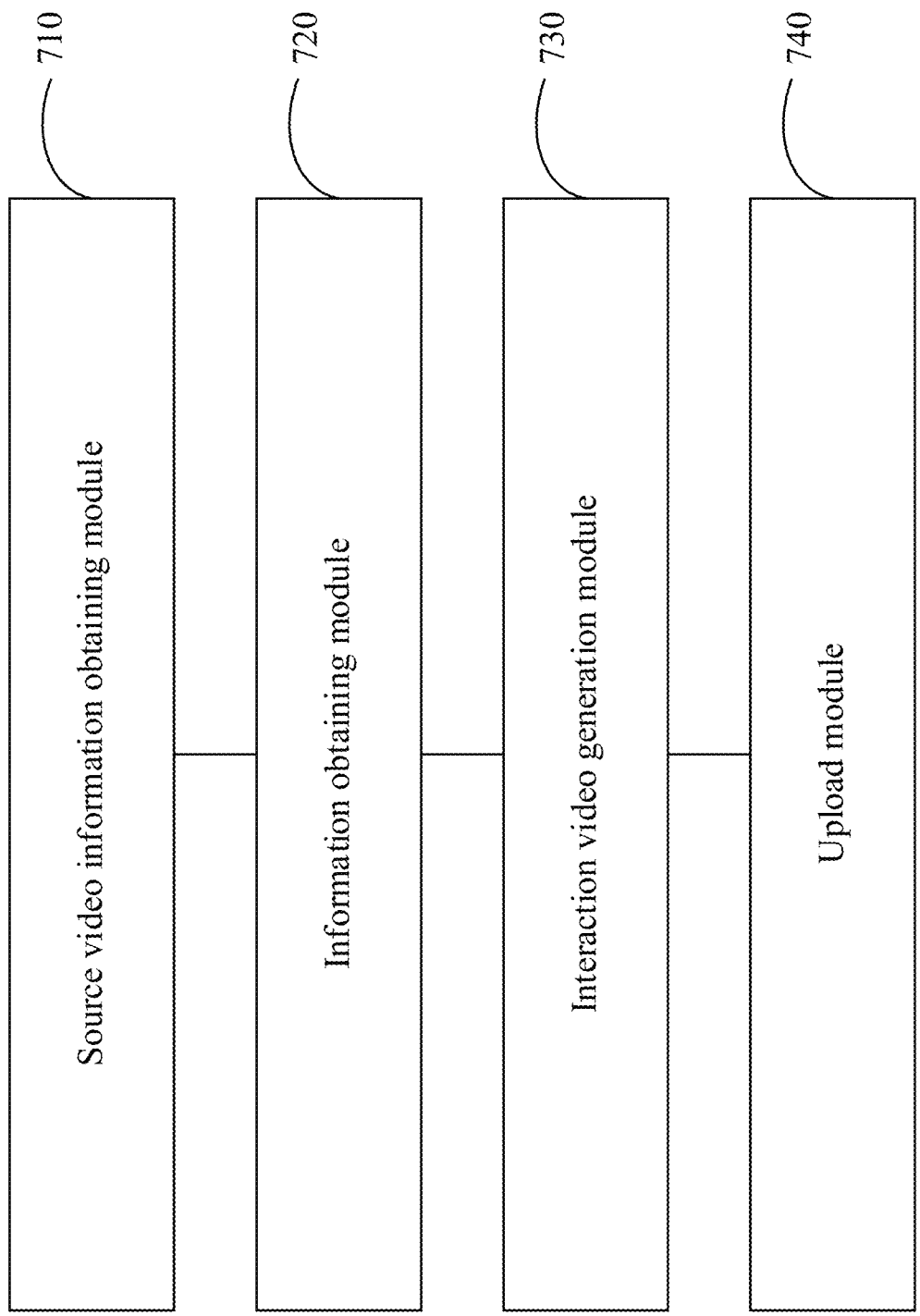
FIG. 16 is a schematic module diagram of a video information processing apparatus according to an embodiment.

As shown in FIG. 16, a video information processing apparatus is provided, which may be disposed in the second terminal 120 in FIG. 1, and includes:

a source video information obtaining module 710, configured to receive source video information transmitted by a server, the source video information including: a source video ID, a source video corresponding to the source video ID, a first user ID transmitting the source video, and a storage location of the source video in the server;

an information obtaining module 720, configured to obtain special effect information on the source video;

an interaction video generation module 730, configured to generate, according to the storage location, the source video ID, and the special effect information, interaction video information associated with the source video ID, the interaction video information including: the source video ID, the storage location, and the special effect information; and an upload module 740, configured to upload the interaction video information to the server, so that the server transmits the interaction video information to a terminal corresponding to the first user ID.

In an embodiment, the information obtaining module 720 is specifically configured to obtain the special effect information on the source video in a playing page presenting and playing the source video; and the information obtaining module 720 includes:

a special effect type information obtaining module, configured to receive a special effect type menu opening instruction on the playing page playing the source video, obtain each special effect type ID and corresponding special effect type information according to the special effect type menu opening instruction, and display the obtained special effect type information;

a special effect content information obtaining module, configured to receive a special effect type selection instruction, where the special effect type selection instruction carries a selected special effect type ID, obtain each special effect content ID associated with the selected special effect type ID and corresponding special effect content information, and display the special effect content information; and a special effect information obtaining module, configured to receive a special effect content selection instruction, where the special effect content selection instruction carries a selected special effect content ID, and obtain special effect information corresponding to the selected special effect content ID.

In an embodiment, the special effect information obtaining module is further configured to: after receiving the special effect content selection instruction, obtain each special effect play form ID associated with the selected special effect content ID and corresponding special effect play form information, and display the special effect play form information; and receive a special effect play form selection instruction, where the special effect play form selection instruction carries a selected special effect play form ID;

the special effect information on the source video including: special effect information corresponding to the selected special effect content ID, and special effect play form information corresponding to the selected special effect play form ID.

In an embodiment, the special effect information obtaining module is further configured to: after receiving the special effect content selection instruction, obtain each special effect play form ID associated with the selected special effect content ID and corresponding special effect play form information, and display the special effect play form information; and receive a special effect play form selection instruction, where the special effect play form selection instruction carries a selected special effect play form ID;

the special effect information on the source video including: special effect information corresponding to the selected special effect content ID, and special effect play form information corresponding to the selected special effect play form ID.

Figure 17:
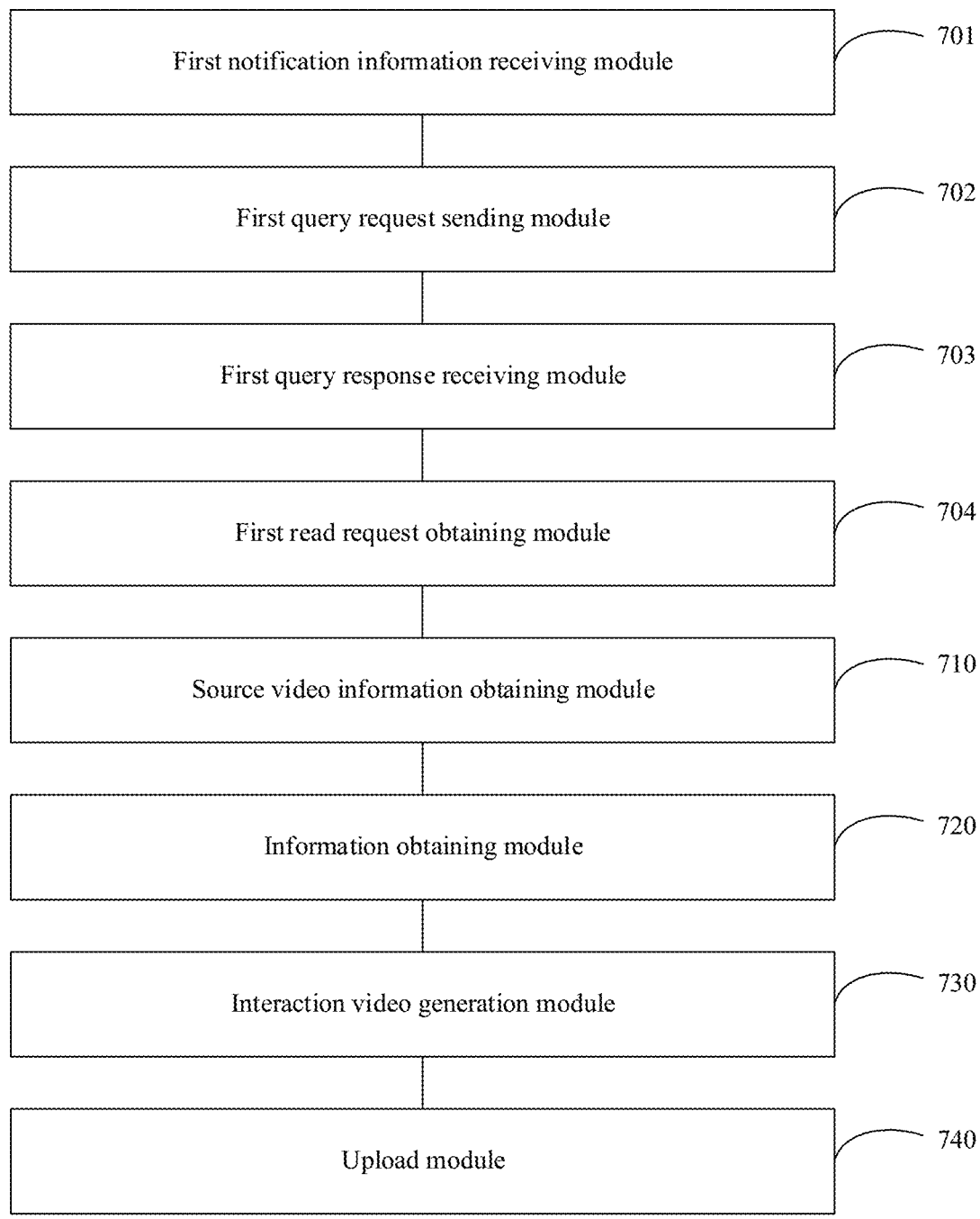
FIG. 17 is a schematic module diagram of a video information processing apparatus according to another embodiment.

As shown in FIG. 17, in an embodiment, the video information processing apparatus further includes:

a first notification information receiving module 701, configured to receive first notification information transmitted by the server, and display the first notification information;

a first query request sending module 702, configured to receive an operation instruction on the first notification information, and transmit a first query request to the server according to the operation instruction, where the first query request carries a second user ID;

a first query response receiving module 703, configured to receive a query response that is returned by the server according to the first query request, where the query response includes: a source video ID associated with the second user ID and in an unread state, and a user ID corresponding to the source video ID in an unread state; and a first reading request obtaining module 704, configured to receive a selection and view instruction, and transmit a first reading request to the server according to the selection and view instruction, where the first reading request carries the first user ID;

the source video information being source video information that is returned by the server in response to the first reading request.

The video information processing apparatus disposed in the second terminal corresponds to the video information processing method applied to the second terminal, and technical features in the video information processing apparatus and corresponding to the video information processing method are not described herein again.

Figure 18:
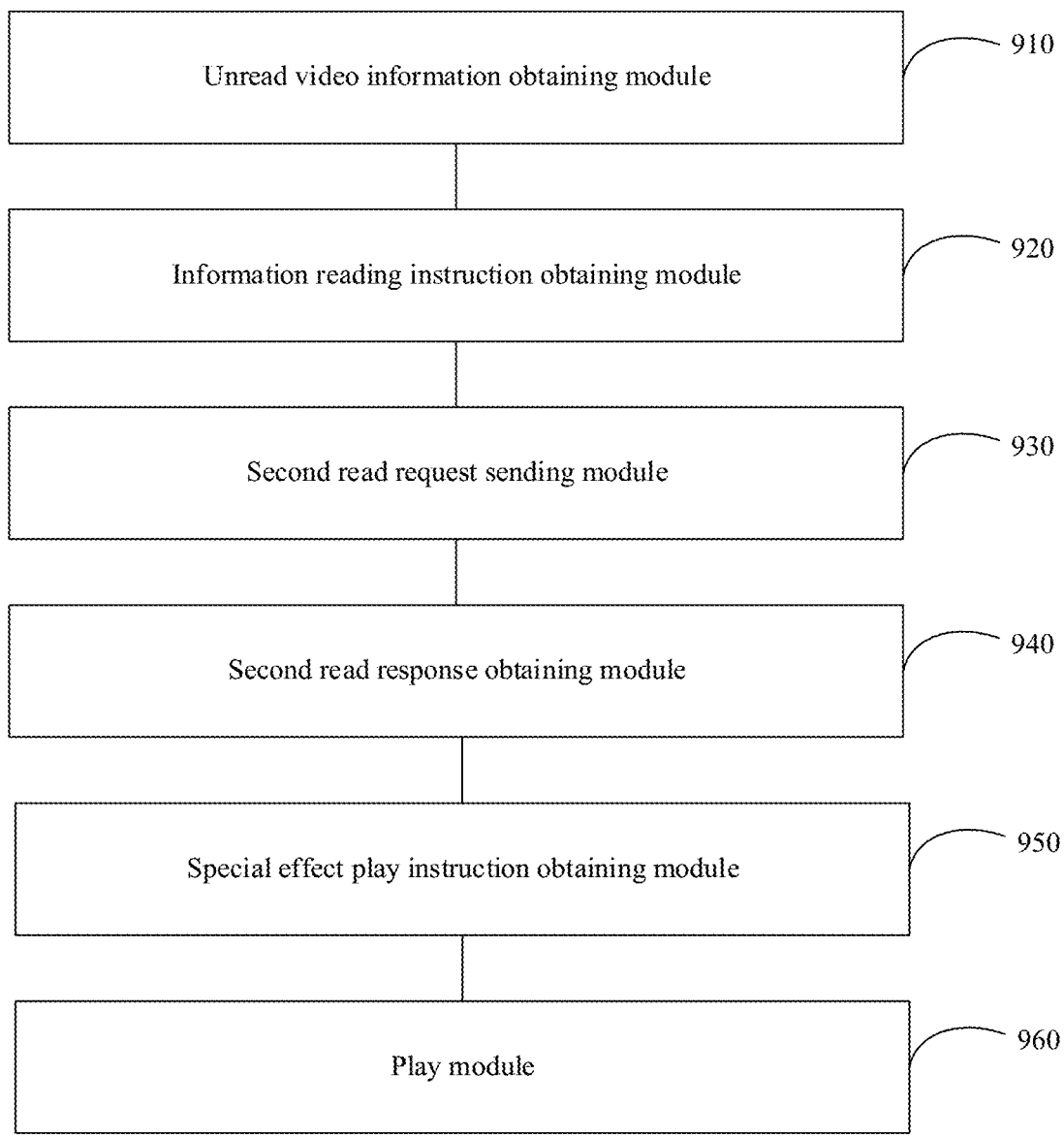
FIG. 18 is a schematic module diagram of a video information processing apparatus according to an embodiment.

As shown in FIG. 18, a video information processing apparatus is provided, which may be disposed in the first terminal 110 in FIG. 1, and includes:

an unread video information obtaining module 910, configured to receive unread video information transmitted by a server, the unread video information including: each interaction video information ID in an unread state, and a source video ID associated with the interaction video information ID;

an information reading instruction obtaining module 920, configured to receive an information reading instruction, the information reading instruction carrying a first source video ID;

a second reading request sending module 930, configured to transmit a second reading request to the server according to the information reading instruction, the second reading request carrying the first source video ID;

a second reading response obtaining module 940, configured to receive a second reading response returned by the server, the second reading response including interaction video information that is in the unread video information and that is corresponding to each interaction video information ID associated with the first source video ID;

a special effect play instruction obtaining module 950, configured to receive a special effect play instruction, the special effect play instruction carrying a first interaction video information ID; and a play module 960, configured to play a source video corresponding to the first source video ID and special effect information in interaction video information corresponding to the first interaction video information ID.

In an embodiment, the video information processing apparatus further includes:

a second notification information obtaining module, configured to receive second notification information transmitted by the server; and a second query request sending module, configured to receive an operation instruction on the second notification information; and transmit a second query request to the server according to the operation instruction, where the second query request carries a first user ID;

the received unread video information transmitted by the server being received unread video information that is returned by the server in response to the second query request.

In an embodiment, the video information processing apparatus further includes:

a pendant generation module, configured to generate a corresponding pendant according to each interaction video information ID associated with the first source video ID and display the pendant; and a special effect play instruction obtaining module, configured to receive the special effect play instruction by using the pendant.

In an embodiment, the play module is specifically configured to: when playing the source video corresponding to the first source video ID, locally search for and obtain the source video corresponding to the first source video ID;

or the second reading response includes the source video corresponding to the first source video ID.

The video information processing apparatus disposed in the first terminal corresponds to the video information processing method applied to the first terminal, and technical features in the video information processing apparatus and corresponding to the video information processing method are not described herein again.

An embodiment of this application further provides a computer device, including a memory and a processor. The memory stores a computer program. The computer program, when executed by the processor, causes the processor to perform steps of the video information processing methods in the foregoing embodiments.

An embodiment of this application further provides a computer storage medium, storing a computer program. The computer program, when executed by a processor, causes the processor to perform steps of the video information processing methods in the foregoing embodiments.

It should be understood that, the steps of the embodiments of this application are not necessarily performed according to a sequence indicated by step numbers. Unless otherwise explicitly stated in this specification, these steps are not necessarily performed in a strictly limited order, and the steps may be performed in other orders. In addition, at least some of the steps in the embodiments may include a plurality of sub-steps or a plurality of stages. These sub-steps or stages are not necessarily performed at a same moment, but may be performed at different moments. These sub-steps or stages are not necessarily performed sequentially, but may be performed by turns or alternately with other steps or at least some sub-steps or stages of other steps.

A person of ordinary skill in the art may understand that all or some of the processes in the method in the foregoing embodiments may be implemented by a computer program instructing relevant hardware. The program may be stored in a non-volatile computer-readable storage medium. For example, in the embodiments of the present disclosure, the program may be stored in a non-volatile computer-readable storage medium of a computer system, and is executed by at least one processor in the computer system, to implement the processes including the foregoing method embodiments. Any reference to a memory, a storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ES- DRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features of the embodiments described above may be combined in any way. For brevity of description, possible combinations of the technical features in the foregoing embodiments are not exhausted, which, however, is to considered as falling within the scope of this specification as long as there is no contradiction in the combinations of these technical features.

The described embodiments are merely some embodiments of this application, which are specific and detailed. However, it is not to be understood as a limitation to the patent scope of this application. Persons of ordinary skill in the art may further make some variations and improvements without departing from the concept of this application, and the variations and improvements belong to the protection scope of this application. Therefore, the protection scope of this application shall be subject to the protection scope of the appended claims.

What is claimed is:

1. A video information processing method, applied to a computer device, the method comprising the following operations:
   receiving source video information transmitted by a server, the source video information comprising: a source video identifier (ID), a source video corresponding to the source video ID, a first user ID of a social networking application corresponding to a first user of a first terminal transmitting the source video to be shared with direct contacts of the first user ID, and a storage location of the source video in the server, wherein the computer device is associated with a second user ID of the social networking application and the second user ID is one of the direct contacts of the first user ID on the social networking application;
   playing the source video in a playing page on a display of the computer device;
   while playing the source video, obtaining special effect information on the source video, including:
      receiving, from a user of the computer device, a special effect type selection instruction for selecting a special effect type from a preset group of special effect types overlaid on the playing page;
      receiving, from the user of the computer device, a special effect customization instruction for customizing the user-selected special effect type;
      customizing the user-selected special effect type into a user-customized special effect type by adding, according to the special effect customization instruction, user-provided special effect information to predefined special effect information corresponding to the user-selected special effect type;
   in response to a preview instruction on the special effect information, playing, in the playing page at the computer device, the source video along with the special effect information that has been modified based on the user-provided special effect information;
   in response to an instruction to finish applying the special effect information on the source video:
      generating, according to the storage location, the source video ID, and the special effect information, interaction video information associated with the source video ID, the interaction video information comprising: the source video ID, the storage location, and the special effect information; and
      uploading the interaction video information to the server, so that the server stores the interaction video information, allocates an interaction video information ID to the interaction video information, and transmits the interaction video information and the source video individually back to the first terminal corresponding to the first user ID via the social networking application in form of a notification including the second user ID and the source video ID, wherein the interaction video information is configured to be rendered at the first terminal jointly with a play of the source video after a selection of the notification by the first user of the first terminal, wherein the play of the source video includes displaying identity information associated with a third user ID of the social networking application and a representation of a special effect type associated with the third user ID.

2. The video information processing method according to claim 1, wherein the operation of obtaining special effect information on the source video comprises:
   receiving a special effect type menu opening instruction on a playing page playing the source video, obtaining each special effect type ID and corresponding special effect type information according to the special effect type menu opening instruction, and displaying the obtained special effect type information;
   receiving a special effect type selection instruction, the special effect type selection instruction carrying a selected special effect type ID, obtaining each special effect content ID associated with the selected special effect type ID and corresponding special effect content information, and displaying the special effect content information; and
   receiving a special effect content selection instruction, the special effect content selection instruction carrying a selected special effect content ID, and obtaining special effect information corresponding to the selected special effect content ID.

3. The video information processing method according to claim 2, further comprising:
   after receiving a special effect content selection instruction, obtaining each special effect play form ID associated with the selected special effect content ID and corresponding special effect play form information, and displaying the special effect play form information; and receiving a special effect play form selection instruction, the special effect play form selection instruction carrying a selected special effect play form ID; and
   the special effect information on the source video comprising: special effect information corresponding to the selected special effect content ID, and special effect play form information corresponding to the selected special effect play form ID.

4. The video information processing method according to claim 1, further comprising operations of:
   before receiving source video information transmitted by a server:
      receiving first notification information transmitted by the server, and displaying the first notification information;
      receiving an operation instruction on the first notification information, and transmitting a first query request to the server according to the operation instruction, the first query request carrying the second user ID;

receiving a first query response that is returned by the server according to the first query request, the first query response comprising: a source video ID associated with the second user ID and in an unread state, and a user ID corresponding to the source video ID in the unread state; and receiving a selection and view instruction, and transmitting a first reading request to the server according to the selection and view instruction, the first reading request carrying the first user ID, wherein the source video information is source video information that is returned by the server in response to the first reading request.

5. The video information processing method according to claim 1, further comprising:

receiving unread video information transmitted by a server, the unread video information comprising: each interaction video information identifier (ID) in an unread state, and a source video ID associated with the interaction video information ID;

receiving an information reading instruction, the information reading instruction carrying a first source video ID;

transmitting a second reading request to the server according to the information reading instruction, the second reading request carrying the first source video ID;

receiving a second reading response returned by the server, the second reading response comprising interaction video information that is in the unread video information and that is corresponding to each interaction video information ID associated with the first source video ID;

receiving a special effect play instruction, the special effect play instruction carrying a first interaction video information ID; and playing a source video corresponding to the first source video ID and special effect information in interaction video information corresponding to the first interaction video information ID.

6. The video information processing method according to claim 5, further comprising:

before receiving unread video information transmitted by a server:

receiving second notification information transmitted by the server;

receiving an operation instruction on the second notification information; and transmitting a second query request to the server according to the operation instruction, the second query request carrying a first user ID, wherein the received unread video information transmitted by the server being received unread video information that is returned by the server in response to the second query request.

7. The video information processing method according to claim 5, further comprising:

after receiving a second reading response returned by the server:

generating a corresponding pendant according to each interaction video information ID associated with the first source video ID and displaying the pendant; and receiving the special effect play instruction by using the pendant.

8. The video information processing method according to claim 5, wherein:

the source video corresponding to the first source video ID is locally searched for and obtained; and the second reading response includes the source video corresponding to the first source video ID.

9. A computer device, comprising one or more processors, memory coupled to the one or more processors and a plurality of programs stored in the memory that, when executed by the one or more processors, cause the computer device to perform a plurality of operations comprising:

receiving source video information transmitted by a server, the source video information comprising: a source video identifier (ID), a source video corresponding to the source video ID, a first user ID of a social networking application corresponding to a first user of a first terminal transmitting the source video to be shared with direct contacts of the first user ID, and a storage location of the source video in the server, wherein the computer device is associated with a second user ID of the social networking application and the second user ID is one of the direct contacts of the first user ID on the social networking application;

playing the source video in a playing page on a display of the computer device;

while playing the source video, obtaining special effect information on the source video, including:

receiving, from a user of the computer device, a special effect type selection instruction for selecting a special effect type from a preset group of special effect types overlaid on the playing page;

receiving, from the user of the computer device, a special effect customization instruction for customizing the user-selected special effect type;

customizing the user-selected special effect type into a user-customized special effect type by adding, according to the special effect customization instruction, user-provided special effect information to predefined special effect information corresponding to the user-selected special effect type;

in response to a preview instruction on the special effect information, playing, in the playing page at the computer device, the source video along with the special effect information that has been modified based on the user-provided special effect information;

in response to an instruction to finish applying the special effect information on the source video:

generating, according to the storage location, the source video ID, and the special effect information, interaction video information associated with the source video ID, the interaction video information comprising: the source video ID, the storage location, and the special effect information; and uploading the interaction video information to the server, so that the server stores the interaction video information, allocates an interaction video information ID to the interaction video information, and transmits the interaction video information and the source video individually back to the first terminal corresponding to the first user ID via the social networking application in form of a notification including the second user ID and the source video ID, wherein the interaction video information is configured to be rendered at the first terminal jointly with a play of the source video after a selection of the notification by the first user of the first terminal, wherein the play of the source video includes displaying identity information associated with a third user ID of the social networking application and a representation of a special effect type associated with the third user ID.

10. The computer device according to claim 9, wherein the operation of obtaining special effect information on the source video further comprises:
- receiving a special effect type menu opening instruction on a playing page playing the source video, obtaining each special effect type ID and corresponding special effect type information according to the special effect type menu opening instruction, and displaying the obtained special effect type information;
- receiving a special effect type selection instruction, the special effect type selection instruction carrying a selected special effect type ID, obtaining each special effect content ID associated with the selected special effect type ID and corresponding special effect content information, and displaying the special effect content information; and
- receiving a special effect content selection instruction, the special effect content selection instruction carrying a selected special effect content ID, and obtaining special effect information corresponding to the selected special effect content ID.

11. The computer device according to claim 10, wherein the plurality of operations further comprise:
- after receiving a special effect content selection instruction, obtaining each special effect play form ID associated with the selected special effect content ID and corresponding special effect play form information, and displaying the special effect play form information; and
- receiving a special effect play form selection instruction, the special effect play form selection instruction carrying a selected special effect play form ID; and
- the special effect information on the source video comprising: special effect information corresponding to the selected special effect content ID, and special effect play form information corresponding to the selected special effect play form ID.

12. The computer device according to claim 9, wherein the plurality of operations further comprise:
- before receiving source video information transmitted by a server:
  - receiving first notification information transmitted by the server, and displaying the first notification information;
  - receiving an operation instruction on the first notification information, and transmitting a first query request to the server according to the operation instruction, the first query request carrying the second user ID;
  - receiving a first query response that is returned by the server according to the first query request, the first query response comprising: a source video ID associated with the second user ID and in an unread state, and a user ID corresponding to the source video ID in the unread state; and
  - receiving a selection and view instruction, and transmitting a first reading request to the server according to the selection and view instruction, the first reading request carrying the first user ID, wherein the source video information is source video information that is returned by the server in response to the first reading request.

13. The computer device according to claim 9, wherein the plurality of operations further comprise:
- receiving unread video information transmitted by a server, the unread video information comprising: each interaction video information identifier (ID) in an unread state, and a source video ID associated with the interaction video information ID;
- receiving an information reading instruction, the information reading instruction carrying a first source video ID;
- transmitting a second reading request to the server according to the information reading instruction, the second reading request carrying the first source video ID;
- receiving a second reading response returned by the server, the second reading response comprising interaction video information that is in the unread video information and that is corresponding to each interaction video information ID associated with the first source video ID;
- receiving a special effect play instruction, the special effect play instruction carrying a first interaction video information ID; and
- playing a source video corresponding to the first source video ID and special effect information in interaction video information corresponding to the first interaction video information ID.

14. The computer device according to claim 13, wherein the plurality of operations further comprise:
- before receiving unread video information transmitted by a server:
  - receiving second notification information transmitted by the server;
  - receiving an operation instruction on the second notification information; and
  - transmitting a second query request to the server according to the operation instruction, the second query request carrying a first user ID, wherein the received unread video information transmitted by the server being received unread video information that is returned by the server in response to the second query request.

15. The computer device according to claim 13, wherein the plurality of operations further comprise:
- after receiving a second reading response returned by the server:
  - generating a corresponding pendant according to each interaction video information ID associated with the first source video ID and displaying the pendant; and
  - receiving the special effect play instruction by using the pendant.

16. The computer device according to claim 13, wherein:
the source video corresponding to the first source video ID is locally searched for and obtained; and
the second reading response includes the source video corresponding to the first source video ID.

17. A non-transitory computer readable storage medium storing a plurality of machine readable instructions in connection with a computer device having one or more processors, wherein the plurality of machine readable instructions, when executed by the one or more processors, cause the computer device to perform a plurality of operations including:
- receiving source video information transmitted by a server, the source video information comprising: a source video identifier (ID), a source video corresponding to the source video ID, a first user ID of a social networking application corresponding to a first user of a first terminal transmitting the source video to be shared with direct contacts of the first user ID, and a storage location of the source video in the server, wherein the computer device is associated with a second user ID of the social networking application and the second user ID is one of the direct contacts of the first user ID on the social networking application;

playing the source video in a playing page on a display of the computer device;

while playing the source video, obtaining special effect information on the source video, including:
  receiving, from a user of the computer device, a special effect type selection instruction for selecting a special effect type from a preset group of special effect types overlaid on the playing page;
  receiving, from the user of the computer device, a special effect customization instruction for customizing the user-selected special effect type;
  customizing the user-selected special effect type into a user-customized special effect type by adding, according to the special effect customization instruction, user-provided special effect information to predefined special effect information corresponding to the user-selected special effect type;

in response to a preview instruction on the special effect information, playing, in the playing page at the computer device, the source video along with the special effect information that has been modified based on the user-provided special effect information;

in response to an instruction to finish applying the special effect information on the source video;
  generating, according to the storage location, the source video ID, and the special effect information, interaction video information associated with the source video ID, the interaction video information comprising: the source video ID, the storage location, and the special effect information; and
  uploading the interaction video information to the server, so that the server stores the interaction video information, allocates an interaction video information ID to the interaction video information, and transmits the interaction video information and the source video individually back to the first terminal corresponding to the first user ID via the social networking application in form of a notification including the second user ID and the source video ID, wherein the interaction video information is configured to be rendered at the first terminal jointly with a play of the source video after a selection of the notification by the first user of the first terminal, wherein the play of the source video includes displaying identity information associated with a third user ID of the social networking application and a representation of a special effect type associated with the third user ID.

18. The non-transitory computer readable storage medium according to claim 17, wherein the operation of obtaining special effect information on the source video further comprises:
  receiving a special effect type menu opening instruction on a playing page playing the source video, obtaining each special effect type ID and corresponding special effect type information according to the special effect type menu opening instruction, and displaying the obtained special effect type information;
  receiving a special effect type selection instruction, the special effect type selection instruction carrying a selected special effect type ID, obtaining each special effect content ID associated with the selected special effect type ID and corresponding special effect content information, and displaying the special effect content information; and
  receiving a special effect content selection instruction, the special effect content selection instruction carrying a selected special effect content ID, and obtaining special effect information corresponding to the selected special effect content ID.

19. The non-transitory computer readable storage medium according to claim 18, wherein the plurality of operations further comprise:
  after receiving a special effect content selection instruction, obtaining each special effect play form ID associated with the selected special effect content ID and corresponding special effect play form information, and displaying the special effect play form information; and
  receiving a special effect play form selection instruction, the special effect play form selection instruction carrying a selected special effect play form ID; and
  the special effect information on the source video comprising: special effect information corresponding to the selected special effect content ID, and special effect play form information corresponding to the selected special effect play form ID.

20. The non-transitory computer readable storage medium according to claim 17, wherein the plurality of operations further comprise:
  before receiving source video information transmitted by a server:
    receiving first notification information transmitted by the server, and displaying the first notification information;
    receiving an operation instruction on the first notification information, and transmitting a first query request to the server according to the operation instruction, the first query request carrying the second user ID;
    receiving a first query response that is returned by the server according to the first query request, the first query response comprising: a source video ID associated with the second user ID and in an unread state, and a user ID corresponding to the source video ID in the unread state; and
    receiving a selection and view instruction, and transmitting a first reading request to the server according to the selection and view instruction, the first reading request carrying the first user ID, wherein the source video information is source video information that is returned by the server in response to the first reading request.

* * * * *